United States Patent [19]

Shinohara et al.

[11] Patent Number: 5,592,353
[45] Date of Patent: Jan. 7, 1997

[54] POWER SUPPLY SYSTEM

[75] Inventors: Toru Shinohara; Tatsuhiko Kosugi, both of Kawasaki, Japan

[73] Assignee: Fujitsu Limited, Japan

[21] Appl. No.: 343,229

[22] Filed: Nov. 22, 1994

[30] Foreign Application Priority Data

Apr. 18, 1994 [JP] Japan ................... 6-078312

[51] Int. Cl.[6] .................................................. H02H 3/00
[52] U.S. Cl. .................... 361/63; 361/93; 361/23
[58] Field of Search .................... 361/69, 63, 90, 361/91, 118, 93, 25, 23; 360/73.03, 71, 137, 69

[56] References Cited

U.S. PATENT DOCUMENTS 4,636,905  1/1987  Morimoto ........................ 360/137
5,246,479  9/1993  Gami .............................. 360/73.03

Primary Examiner—Jeffrey A. Gaffin
Assistant Examiner—Stephen W. Jackson
Attorney, Agent, or Firm—Greer, Burns & Crain, Ltd.

[57] ABSTRACT

A power supply system includes load circuits connected to a power source circuit through respective power lines. Each of the power lines is provided with a breaker element such as a FET that connects and disconnects the power line to and from the load circuit, and an overcurrent detection resistor for detecting an overcurrent in the load circuit. If an overcurrent is detected according to a signal from the overcurrent detection resistor, a short-circuit protection controller opens the breaker element to cut off the power line from the load circuit. A voltage monitor circuit monitors the voltage of the load circuit, and a control circuit controls the load circuit.

20 Claims, 26 Drawing Sheets

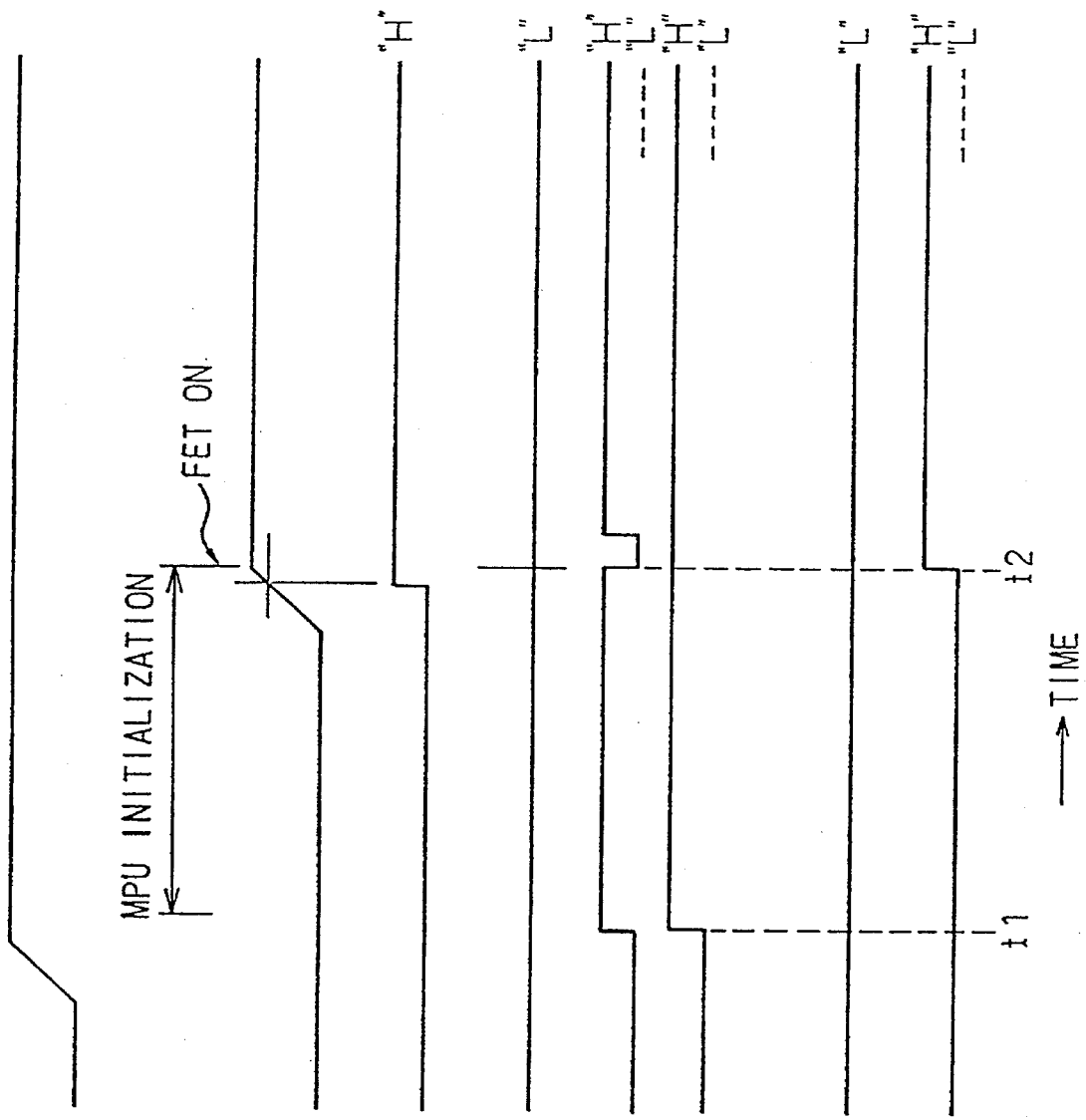

POWER SUPPLY SYSTEM

BACKGROUND OF THE INVENTION

1. Field of the Invention

The present invention relates to a power supply system having a power source to supply power to load circuits through respective power lines.

More particularly, the present invention relates to a power supply system which is capable of cutting off a power line from a load circuit that has caused a failure due to a short circuit (hereinafter, this type of failure will be referred to as a short-circuit failure) to produce an overcurrent, without causing voltage fluctuations, etc., in the other load circuits.

2. Description of the Related Art

Load circuits such as magnetic disk units are required to be compact, and low in production cost. Also, the load circuits are required to have a high efficiency and a high reliability. To satisfy such requirements, it is necessary for a power supply system to have one or more power source circuits which are simultaneously capable of supplying electric power to a plurality of load circuits.

If a short-circuit failure occurs in one of the load circuits in the power supply system, it may adversely affect the other load circuits. To avoid this problem, each load circuit is provided with a protection circuit such as a fuse or a capacitor.

A typical protection circuit is slow to cut off a power line from a failed load circuit, causing a voltage fluctuation in the power line, and therefore involving a troublesome maintenance work. To solve these problems, it is required to provide a power supply system that quickly and surely deals with a short-circuit failure.

Here, to enable some features and problems regarding a conventional power supply system to be understood more clearly, the configuration of each of several power supply systems in the prior art will be explained with reference to FIGS. 1 through 5B.

FIG. 1 is a circuit diagram showing a power supply system according to the first prior art. This system has a power source circuit 3 connected to load circuits 4-1 to 4-n through respective power lines. If one of the load circuits causes a short-circuit failure, an overcurrent flows to the corresponding power line, which adversely affects the other load circuits.

To avoid this, each of the power lines is provided with a fuse F which melts due to an overcurrent. In addition, a capacitor C having a large capacitance is connected between common sections of the positive (+V) and ground (GND) power lines, to prevent the melting of a fuse in a given power line from causing a voltage fluctuation.

FIG. 2 is a circuit diagram showing a first example of a load circuit according to the first prior art. This load circuit drives a three-phase motor 6.

In FIG. 2, the drive circuit has transistors Q1 to Q6 for driving the motor 6, a motor control circuit 7 for controlling the transistors, a current detection resistor R1 for detecting a motor current flowing through the transistors, and a current detection circuit 8 for detecting the motor current according to a voltage generated by the resistor R1.

The load circuit receives electric power from the power source circuit 3 through the positive (+V) and ground (GND) power lines and a fuse F. The motor control circuit 7 sequentially turns ON and OFF the transistors Q1 to Q6 to drive the three-phase motor 6.

When the three-phase motor 6 is driven, a motor current flows through the resistor R1, which generates a terminal voltage corresponding to the motor current between both terminals thereof.

According to this voltage, the current detection circuit 8 detects the motor current and sends a feedback signal to the motor control circuit 7. According to the feedback signal, the motor control circuit 7 drives the motor 6 at a constant speed.

FIG. 3 is a circuit diagram showing a second example of a load circuit according to the first prior art. This load circuit drives a two-terminal motor 10. The load circuit has transistors Q7 to Q10 for driving the two-terminal motor 10, a motor control circuit 7 for controlling the transistors, current detection resistors R3 and R4 for detecting a motor current flowing through the transistors, and a current detection circuit 8 for detecting the motor current according to a voltage generated between both terminals in each of the resistors R3 and R4.

The load circuit receives power from the power source circuit 3 through the positive (+V) and ground (GND) power lines and a fuse F. The motor control circuit 7 sequentially turns ON and OFF the transistors Q7 to Q10, to drive the two-terminal motor 10.

When the two-terminal motor 10 is driven, a motor current flows through the resistors R3 and R4, which generate terminal voltages corresponding to the motor current.

According to these voltages, the current detection circuit 8 detects the motor current and sends a feedback signal to the motor control circuit 7. According to the feedback signal, the motor control circuit 7 drives the two-terminal motor 10 at a constant speed.

If any part, for example, one of the transistors causes a short-circuit failure while the three-phase motor 6 or the two-terminal motor 10 is being driven, an overcurrent flows to the power lines. Then, the fuse F melts to cut off the power lines from the corresponding load circuit, so as to prevent the overcurrent from flowing into the other load circuits.

When the fuse F melts, it fluctuates the voltage of the power lines. This fluctuation is absorbed by the capacitor C, to prevent an adverse effect on the other load circuits.

FIG. 4 is a circuit diagram showing a power supply system according to the second prior art; FIG. 5A is a circuit diagram showing an example of a load circuit according to the second prior art; and FIG. 5B is a time chart for explaining the operation of a power supply system according to the second prior art.

In FIG. 4, load circuits can be respectively connected to power lines and disconnected from the corresponding power lines under an active state. The power supply system of FIG. 4 has a power source circuit 3 and a plurality of load circuits 4-1 to 4-n connected to the power source circuit 3 through respective power lines.

The power lines of each of the load circuits 4-1 to 4-n are provided with a connector 11, which can be coupled and decoupled under an active state.

The load circuit of FIG. 5A is formed on a printed board Pt. The connector 11 is formed at an end of the printed board Pt. The load circuit receives power through the connector 11.

The printed board Pt has the load circuit 4, a capacitor C2, a fuse F, and a current limit resistor R2. An overcurrent generated in the load circuit 4 is stopped by the fuse F.

The connector 11 has male and female pins P1 to P4. The pins P1 and P2 correspond to a positive (+V) power line, the pin P3 corresponds to a signal line S, and the pin P4 corresponds to a ground (GND) power line.

The male pins have the same length, and the female pins formed on the load circuit side have different lengths.

Namely, on the load circuit side, the pins (male pin portions) P1 and P4 have the same length, and the pins P2 and P3 have shorter lengths. These lengths are shown in order by the relation of P1=P4>P2>P3.

When the connector 11 is coupled, i.e., the male pin portions are respectively engaged with the female pin portions, the pins P1 and P4 are connected at first, and the pins P2 and P3 are successively connected. When the connector 11 is decoupled, the pins are disconnected in opposite order.

When the connector 11 is coupled as mentioned above, the pins P1 and P4 are connected at first, to pass a current from the positive (+V) power line to the pin P1, the current limit resistor R2, the fuse F, the capacitor C2, the pin P4, and the ground (GND) power line. If the capacitance of the capacitor C2 and the resistance of the current limit resistor R2 are represented by c2 and r2, respectively, the capacitor C2 is gradually charged at a time constant of r2×c2. This suppresses the generation of a rush (surge) current when the connector 11 is coupled.

As the capacitor C2 is charged, the terminal voltage at both terminals of the capacitor C2 increases. When the voltage reaches a given value, the pin P2 is connected, to short-circuit the current limit resistor R2. As a result, the voltage of the capacitor C2 increases to a predetermined value to supply a sufficient operation voltage to the load circuit 4.

Thereafter, the pin P3 is connected to connect the signal line S to the load circuit 4. As a result, external control signals are supplied to the load circuit 4, to start a normal operation of the load circuit 4.

When the connector 11 is decoupled, the pin P3 is disconnected at first, to stop the supply of signals. Then, the pin P2 is disconnected to let the current limit resistor R2 pass a limited current. Thereafter, the pins P1 and P4 are disconnected to entirely cut off the supply of power.

Referring to FIG. 5B, the pins P1 and P4 are connected at the timing corresponding to time t1, and a charging current flows to the capacitor C2 through the current limit resistor R2, as indicated with a portion indicating a voltage level of the capacitor C2 (①).

The pin P2 is connected at the timing corresponding to time t2, and the voltage of the capacitor C2 reaches the predetermined value, to supply a sufficient operation voltage to the load circuit 4. The pin P3 is connected at the timing corresponding to time t3, and external signals are supplied to the load circuit 4, to start a normal operation of the load circuit 4, as indicated with a portion indicating a voltage level of the signal line (②).

The above-mentioned prior art involve the following problems:

(1) If a short-circuit failure occurs in one of the load circuits, an overcurrent flows to melt the fuse F to cut off the power line from the load circuit in question. The fuse takes time to melt, causing a voltage drop or fluctuation in the other load circuits.

To prevent such a voltage drop or fluctuation, the large capacitor C must be arranged in the power lines. The large capacitor is expensive which increases the cost of the power supply system.

In addition, the characteristics of the capacitor deteriorate as it is being used over a long term, to lower the reliability of the system. The capacitor requires, therefore, troublesome periodic maintenance and replacement.

(2) If a short-circuit failure occurs in one of the load circuits, the fuse melts to prevent a voltage fluctuation in the other load circuits. Until the fuse melts, it is necessary to maintain a supply voltage within a specified range.

Accordingly, a large capacitor must be installed in the power lines, or a power source of a large capacity must be employed. This increases costs, deteriorates reliability, and limits design criteria.

(3) To realize connection of load circuits with power lines under an actual state in the second prior art, it is necessary to install the current limit resistor R2 for each load circuit. This limits the design criteria of the load circuit. The current limit resistor causes a loss which deteriorates efficiency and generates heat thus deteriorating reliability.

SUMMARY OF THE INVENTION

In view of this, an main object of the present invention is to provide a power supply system that uses no fuse, speedily blocks an overcurrent due to a short-circuit failure in a load circuit, and prevents the blocking of the overcurrent from adversely affecting the other load circuits.

Another object of the present invention is to provide a power supply system that employs a high-speed breaker element to rapidly connect and disconnect a power line to and from a load circuit, to minimize a capacitor, reduce the cost, and improve efficiency and reliability.

Still another object of the present invention is to provide a power supply system that connects and disconnects a power line to and from a load circuit under an active state without using special connectors.

To attain the above objects, the power supply system according to the present invention, that supplies power from a power source circuit to load circuits through respective power lines, includes a breaker element provided for each of the power lines, which is turned ON and OFF in response to external control signals, to connect and disconnect the power source circuit to and from the load circuit; an overcurrent detection resistor provided for each of the power lines, which detects an overcurrent in the load circuit; and a short-circuit protection controller provided for each of the power lines, which turns OFF the breaker element to disconnect the power line from the load circuit if a signal from the overcurrent detection resistor indicates that there is an overcurrent in the load circuit.

Alternatively, the power supply system according to the present invention includes a breaker element provided for each of the power lines, which is turned ON and OFF in response to external control signals, to connect and disconnect the power source circuit to and from the load circuit; and a short-circuit protection controller provided for each of the power lines, which turns OFF the breaker element to disconnect the power line from the load circuit if a signal from a current detection resistor disposed in the load circuit indicates that there is an overcurrent in the load circuit.

Preferably, the power supply system includes control means for turning ON the breaker element if the breaker element is turned OFF to cut off the power line from the load circuit, to resume the supply of power to the load circuit, confirming whether or not an overcurrent really flows from the load circuit, and if it really flows, again turning OFF the breaker element to cut off the power line from the load circuit.

Further, preferably, the power supply system includes a voltage monitor circuit for monitoring the voltage of the load circuit; and control means for turning ON the breaker element to completely connect the power source circuit to the load circuit if a signal from the voltage monitor circuit indicates that a power source has been successfully activated.

Further, preferably, the power supply system includes a control circuit for controlling the load circuit; and control means provided for the control circuit, for turning ON the breaker element after the initialization of the control circuit, to connect the power source circuit to the load circuit, when a power source of the control circuit is different from that of the short-circuit protection controller.

Further, preferably, the power supply system includes a control circuit for controlling the load circuit; and control means provided for the control circuit, for turning OFF the breaker element to cut off the power line from the load circuit in response to not only an overcurrent but also an abnormal current out of a range specified by the control circuit.

Further, preferably, the power supply system includes control means for repeatedly turning ON and OFF the breaker element to increase the voltage of the load circuit, and completely turning ON the breaker element to connect the power source circuit to the load circuit.

Further, preferably, the power supply system includes a control circuit connected to the power line of the load circuit, for controlling the load circuit; and a current limit resistor connected in parallel with the breaker element, for passing a small current while the breaker element is OFF, the control circuit being sufficiently driven with the small current.

Further, preferably, the power supply system includes a voltage monitor circuit for monitoring the voltage of the load circuit; and control means for confirming that the voltage of the load circuit has reached a predetermined value according to a signal from the voltage monitor circuit, and turning ON the breaker element to connect the power source circuit to the load circuit.

Further, preferably, the power supply system includes a standard connector connected to the power line of the load circuit; and control means provided for the control circuit, for turning ON the breaker element to connect the power source circuit to the load circuit after detecting that the connector has been connected to the power source circuit, the control circuit has been initialized, and the voltage of the load circuit has reached a predetermined value.

In some preferred embodiments, the breaker element is constituted by a field effect transistor.

Further, in some preferred embodiments, the load circuit is constituted by a motor drive circuit of a magnetic disk unit.

According to the power supply system of the present invention, when a short-circuit failure occurs in the load circuit and an overcurrent flows through the overcurrent detection resistor, the short-circuit protection controller opens the breaker element, to cut off the power line from the load circuit.

Further, the opening of the breaker element is carried out at higher speed than the melting of a fuse. Consequently, it is possible to optimize the capacity of the power source circuit and omit the capacitor used to prevent voltage fluctuations, unlike the prior art. Also, the breaker element can minimize a voltage drop or fluctuation that adversely affects the other load circuits.

BRIEF DESCRIPTION OF THE DRAWINGS

The above objects and features of the present inventions will be more apparent from the following description of preferred embodiments with reference to the accompanying drawings, wherein:

FIG. 22 is a time chart for explaining a first example of the operation of a power supply system according to a fourth preferred embodiment of the present invention;

DESCRIPTION OF THE PREFERRED EMBODIMENTS

Figure 1:
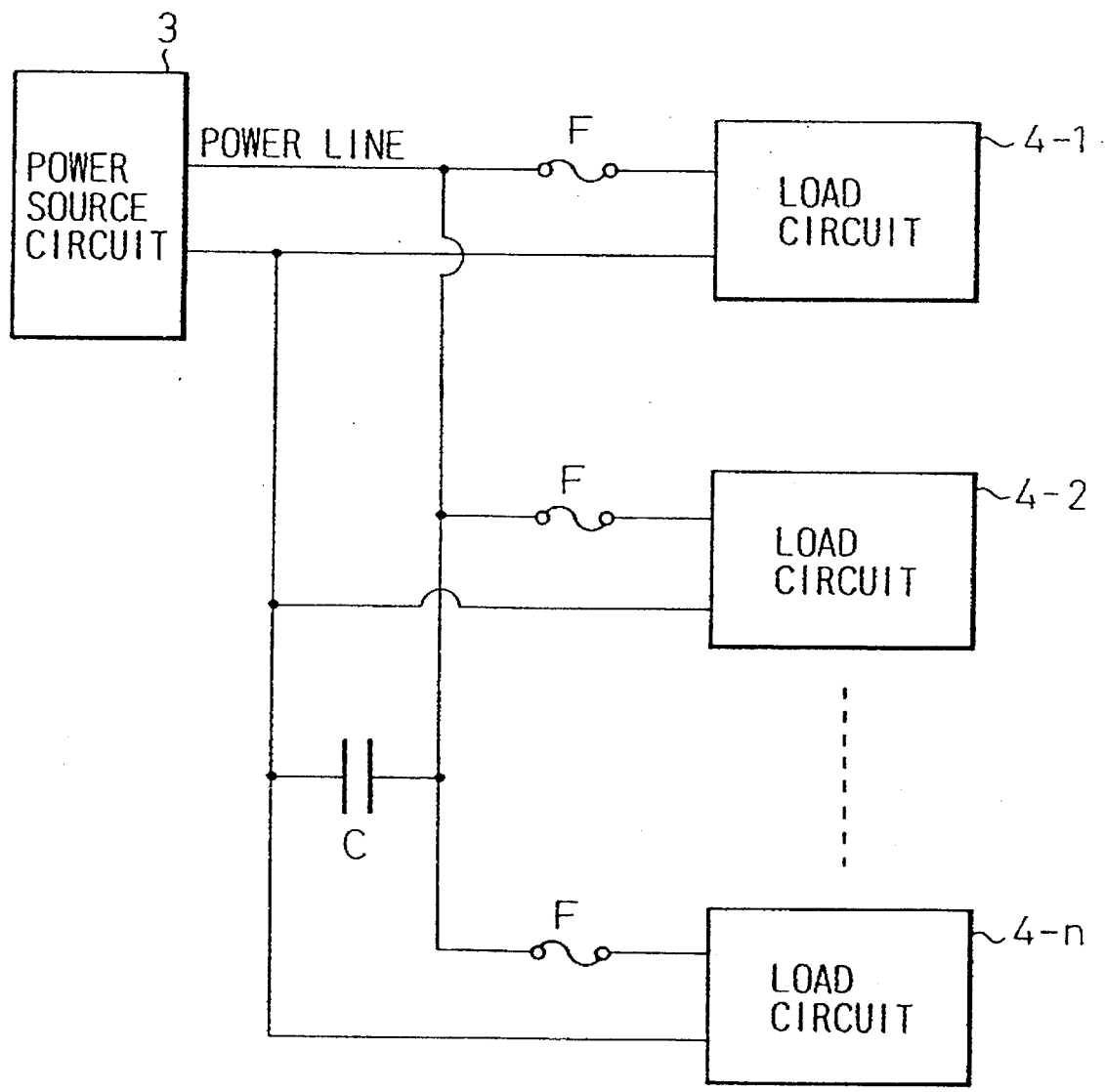
FIG. 1 is a circuit diagram showing a power supply system according to the first prior art.
Figure 2:
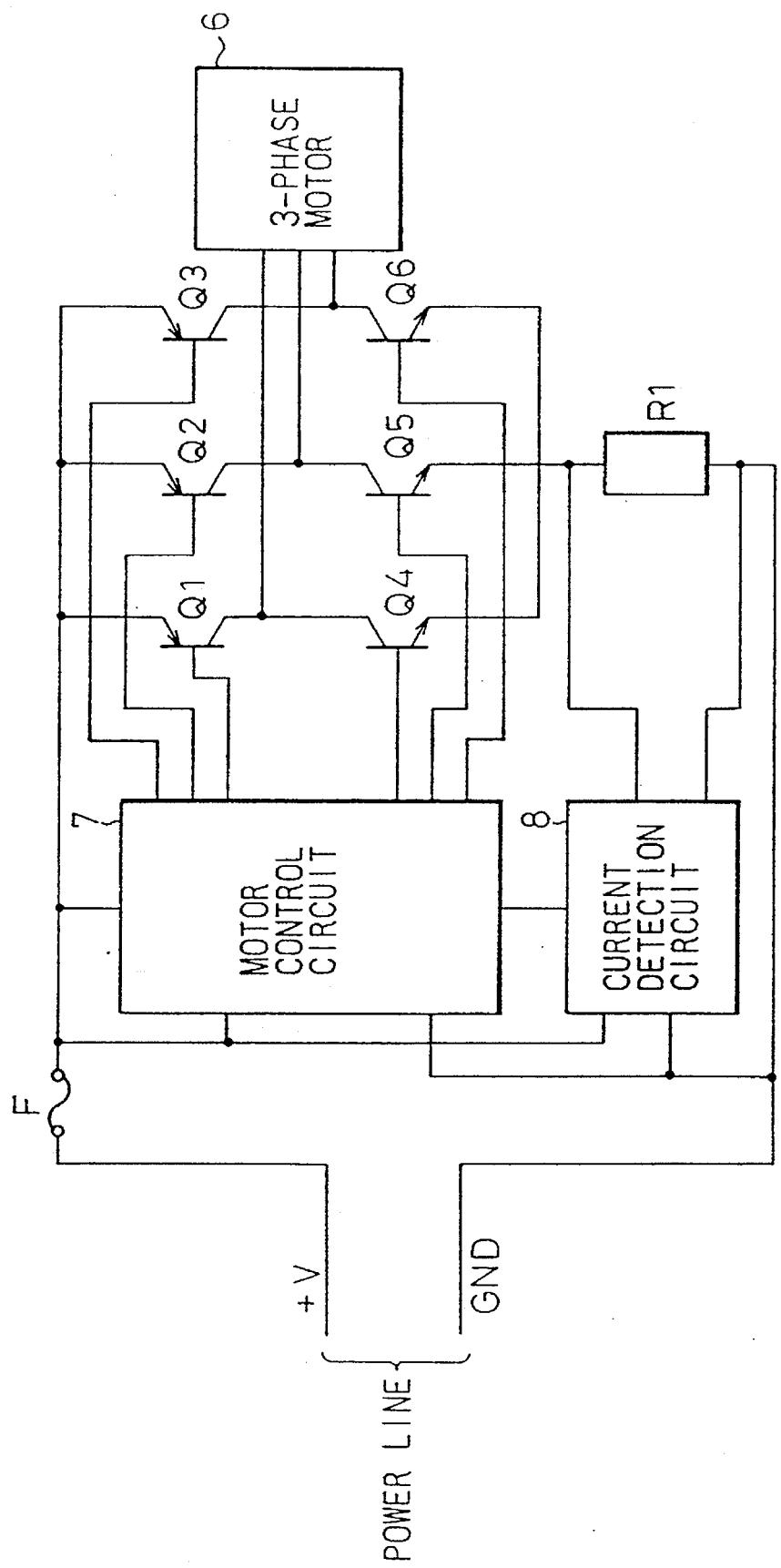
FIG. 2 is a circuit diagram showing a first example of a load circuit according to the first prior art.
Figure 3:
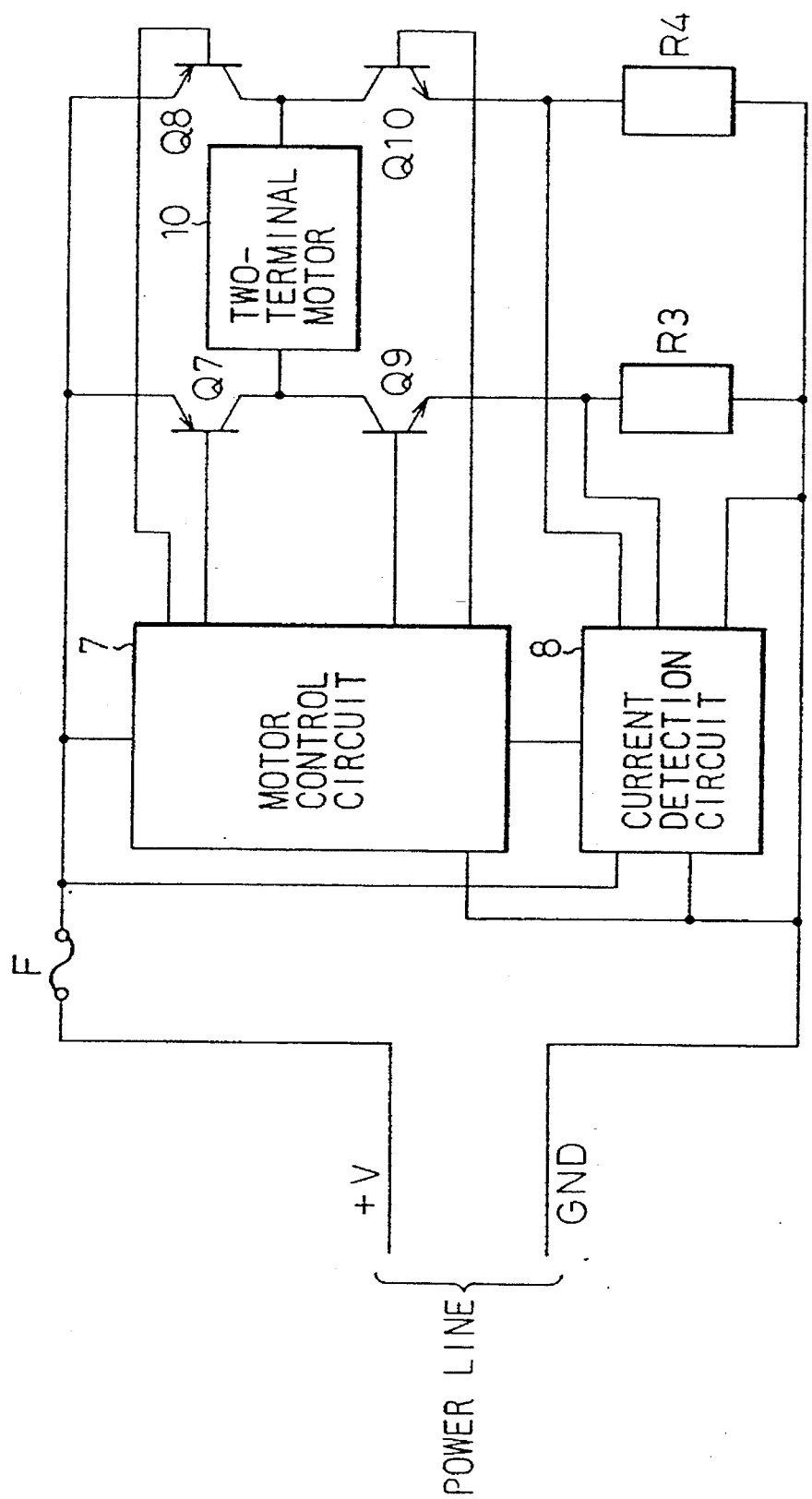
FIG. 3 is a circuit diagram showing a second example of a load circuit according to the first prior art.
Figure 4:
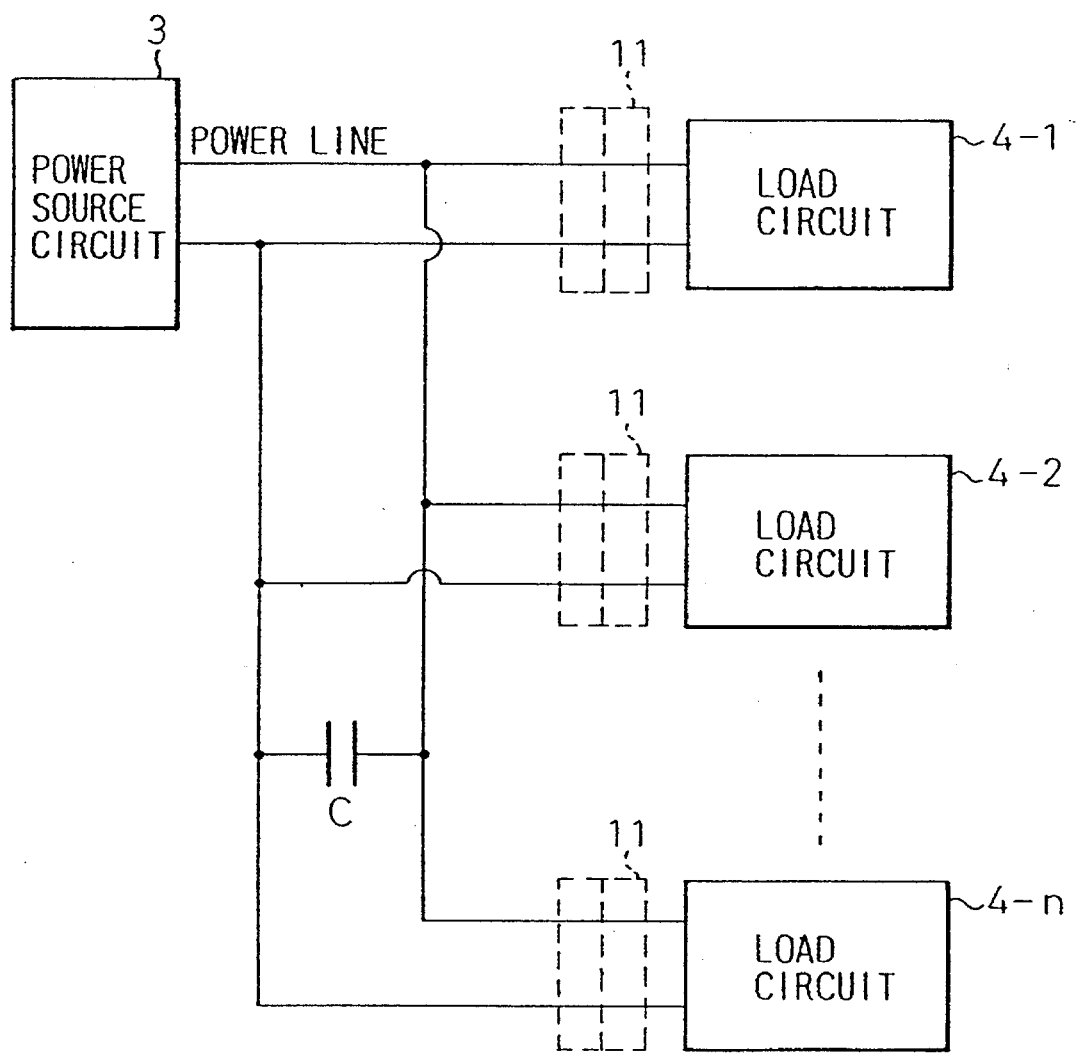
FIG. 4 is a circuit diagram showing a power supply system according to the second prior art.
Figure 5A:
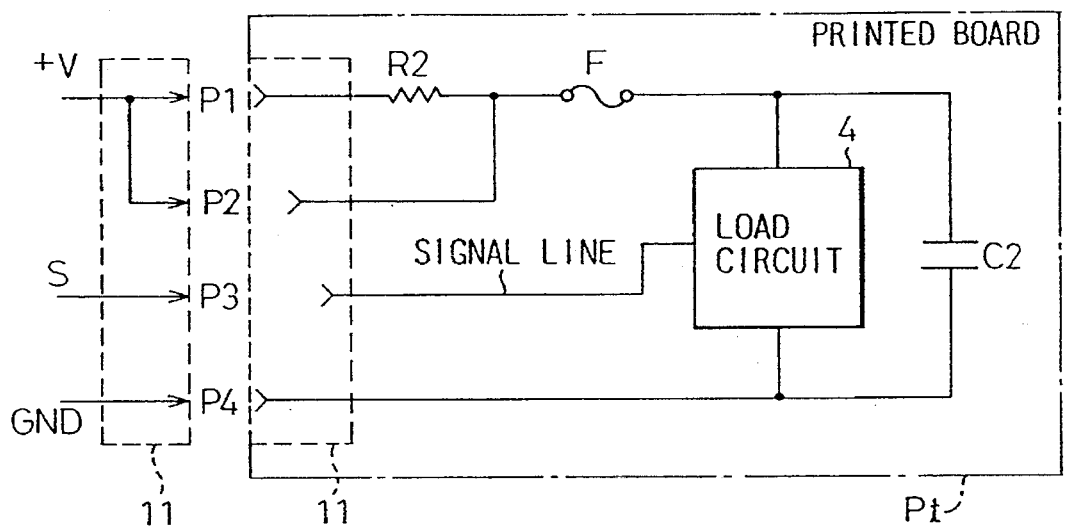
FIG. 5A is a circuit diagram showing an example of a load circuit according to the second prior art.
Figure 5B:
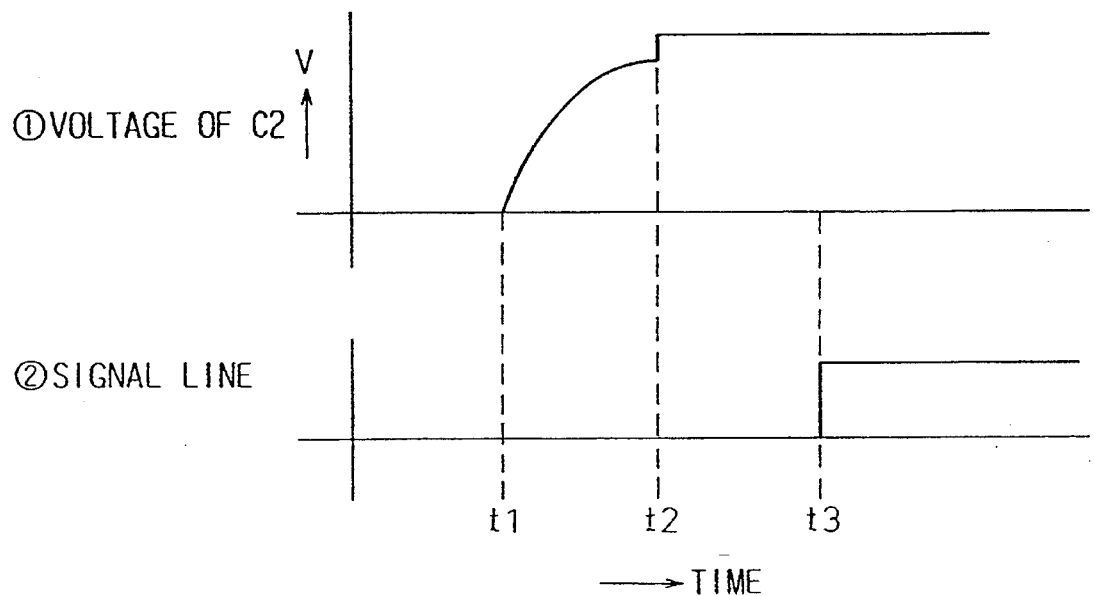
FIG. 5B is a time chart for explaining the operation of a power supply system according to the second prior art.

Embodiments of the present invention will now be explained with reference to FIGS. 6 through 26. Especially, the preferred embodiments mentioned below in FIGS. 7 through 26 relate to magnetic disk subsystems or magnetic disk units. Throughout the figures, the same reference numerals or marks as those of FIGS. 1 to 5 represent like parts.

Figure 6:
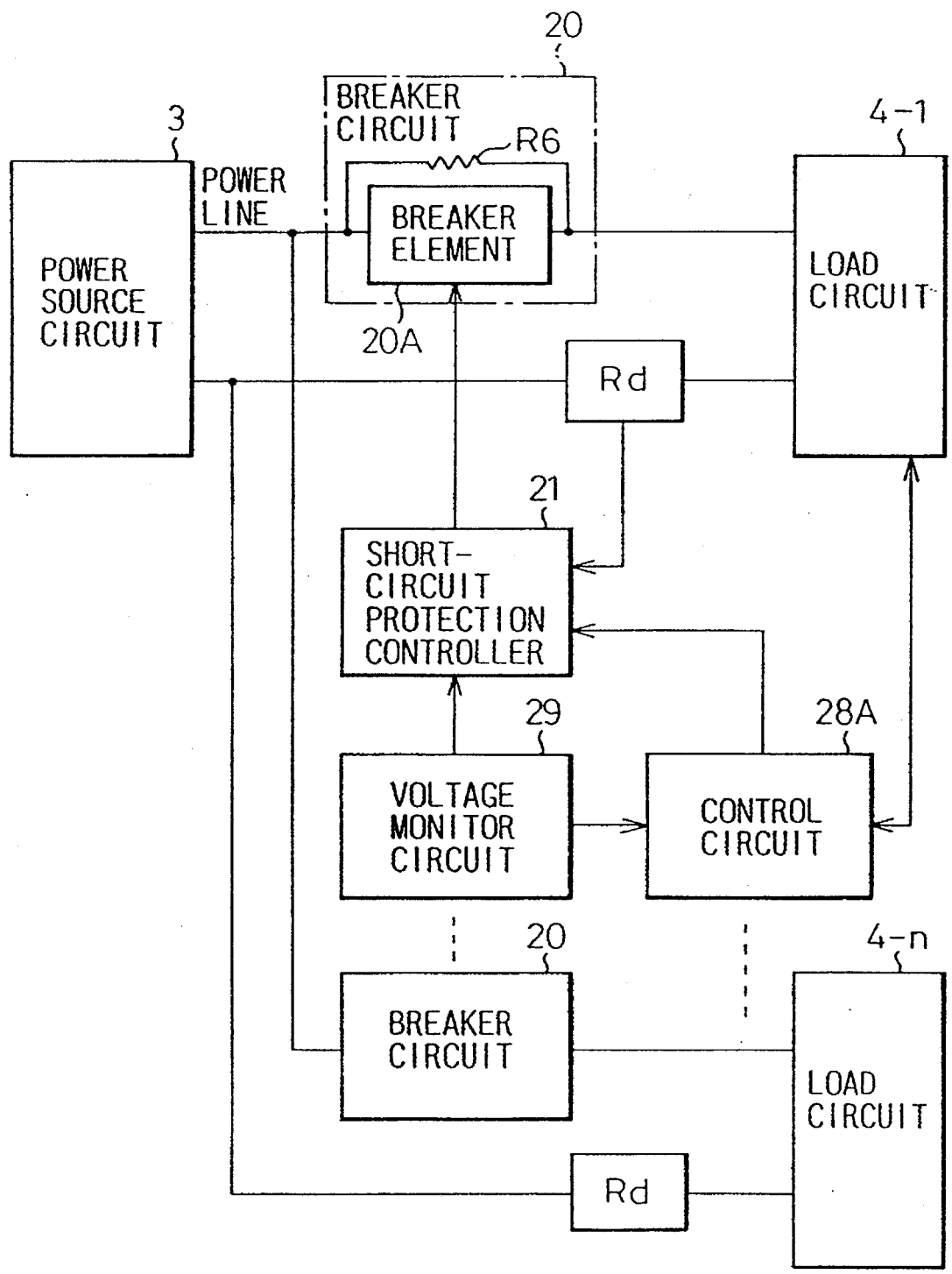
FIG. 6 is a block diagram showing an essential embodiment based on the principle of the present invention.

FIG. 6 is a block diagram showing an essential embodiment based on the principle of the present invention.

The power supply system includes a power source circuit 3 connected to load circuits 4-1 to 4-n through respective power lines. Each of the power lines is provided with a breaker circuit 20 and an overcurrent detection resistor Rd. The breaker circuit 20 has a breaker element 20A to connect and disconnect the power line to and from the load circuit, and a current limit resistor R6 connected in parallel with the breaker element 20A.

When the resistor Rd provides a signal indicating an overcurrent, a short-circuit protection controller 21 opens the breaker element 20A to cut off the power line from the load circuit that has caused the overcurrent. A voltage monitor circuit 29 monitors the voltage of the load circuit. A control circuit 28A controls the load circuit.

The operation of one of the load circuits of the power supply system according to the present invention is as follows:

(1) When the voltage of the power line rises, a current flows to the load circuit through the current limit resistor R6 of the breaker circuit 20, to gradually increase the voltage of the load circuit. According to signals from the control circuit 28A and voltage monitor circuit 29, the short-circuit protection controller 21 closes (turns ON) the breaker element 20A.

When the breaker element 20A is closed, a current flows to the load circuit through the breaker element 20A by bypassing the current limit resistor R6. As a result, the voltage of the load circuit increases to a predetermined value, to start a normal operation of the load circuit.

If a short-circuit failure occurs in the load circuit and an overcurrent flows through the overcurrent detection resistor Rd, the short-circuit protection controller 21 opens (turns OFF) the breaker element 20A, to cut off the power line from the load circuit.

In this way, if a short-circuit failure occurs in a load circuit, the breaker element 20A of the breaker circuit 20 connected to the power line of the load circuit is opened to stop the supply of power to the load circuit.

The opening of the breaker element 20A is carried out at higher speed than the melting of a fuse. Accordingly, it is possible to optimize the capacity of the power source circuit and omit the capacitor used to prevent voltage fluctuations. The breaker element 20A minimizes a voltage drop or fluctuation that adversely affects the other load circuits.

FIGS. 7 to 10 show the circuit configuration of a power supply system according to the first preferred embodiment of the present invention.

Figure 7:
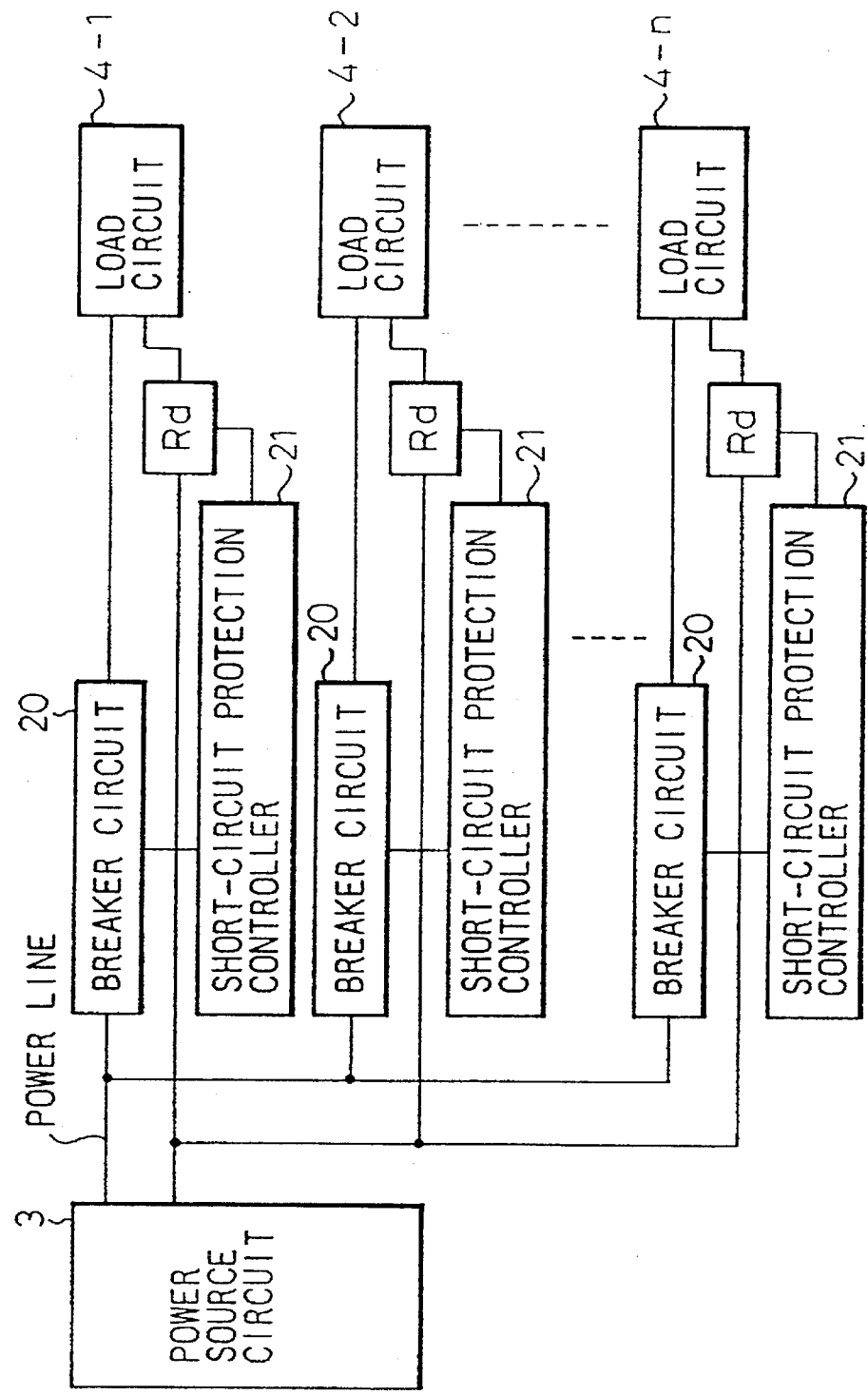
FIG. 7 is a block diagram showing a power supply system according to a first preferred embodiment of the present invention.

More specifically, FIG. 7 is a block diagram showing the whole configuration of a power supply system according to the first preferred embodiment.

In FIG. 7, the power supply system includes a power source circuit 3 and load circuits 4-1 to 4-n that are connected in parallel with the power source circuit 3 through respective power lines.

The power line of each of the load circuits 4-1 to 4-n is provided with an overcurrent detection resistor Rd for detecting an overcurrent in the load circuit, and a breaker circuit 20 for cutting off the power line from the load circuit if an overcurrent is detected.

Each power line is also provided with a short-circuit protection controller 21 for opening and closing the breaker circuit 20 according to a signal from the overcurrent detection resistor Rd. When detecting an overcurrent in the load circuit, the short-circuit protection controller 21 sends a control signal to the breaker circuit 20 to cut off the power line from the load circuit.

In this way, the power supply system of the first preferred embodiment consists of groups of the load circuit, breaker circuit 20, overcurrent detection resistor Rd, and short-circuit protection controller 21, to protect the load circuits group by group against a short-circuit failure.

Each load circuit may be a magnetic disk unit, a spindle motor drive circuit, or a voice coil motor (VCM) drive circuit. The breaker circuit 20 employs, instead of a fuse, a high-speed semiconductor breaker element such as a field effect transistor (FET).

During a normal operation, the breaker circuit 20 is closed to supply power from the power source circuit 3 to the load circuit. If the load circuit causes a short-circuit failure to pass an overcurrent to the power line, the overcurrent detection resistor Rd generates a voltage corresponding to the overcurrent.

Upon detecting this voltage, the short-circuit protection controller 21 sends a control signal to the breaker circuit 20 to cut off the power line from the load circuit, thereby preventing a voltage fluctuation in the other load circuits.

Figure 8:
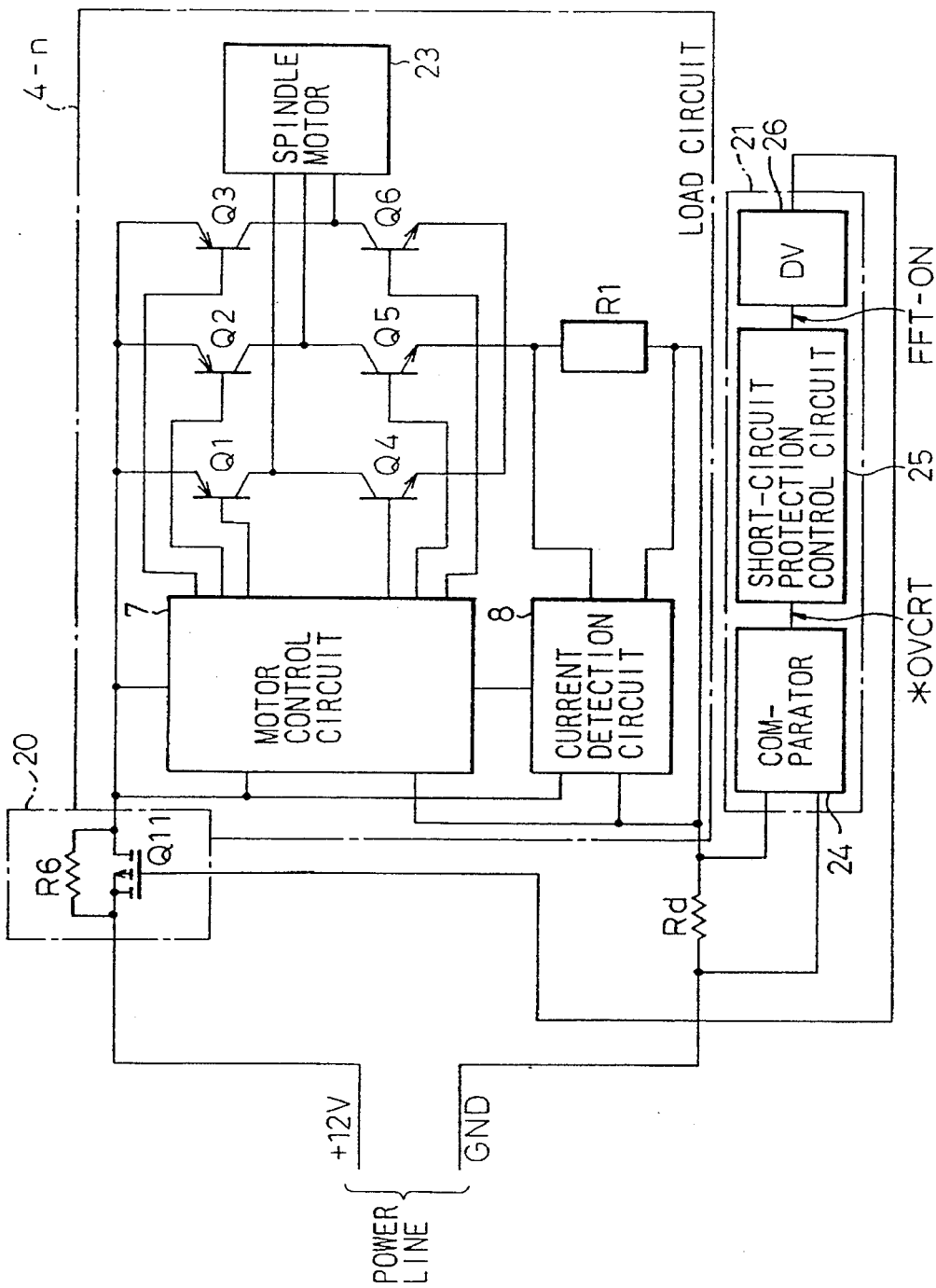
FIG. 8 is a circuit diagram showing one of a plurality of load circuits provided in a power supply system of FIG. 7.

FIG. 8 is a circuit diagram showing one of a plurality of load circuits provided in a power supply system of FIG. 7. Namely, FIG. 8 shows the details of one (e.g., a load circuit 4-n) of the load circuits of FIG. 7.

The load circuit 4-n includes a spindle motor drive circuit and a spindle motor 23. The breaker circuit 20 includes a field effect transistor (FET) Q11 and a current limit resistor R6. The short-circuit protection controller 21 includes a comparator 24, a short-circuit protection control circuit 25, and a driver (DV) 26.

The comparator 24 compares a voltage generated by the resistor Rd with an internal reference value, and if an overcurrent is found, provides an overcurrent detection signal *OVCRT.

In response to the signal *OVCRT and an external control signal (to be explained later), the short-circuit protection control circuit 25 provides a signal FET-ON to turn ON or OFF the FET Q11.

In response to the signal FET-ON, the driver 26 drives the FET Q11 of the breaker circuit 20.

The load circuit 4-n has the spindle motor 23 for rotating magnetic disks of a magnetic disk unit, transistors Q1 to Q6 for driving the spindle motor 23, a motor control circuit 7 for controlling the transistors, a current detection resistor R1 for detecting a motor current, and a current detection circuit 8 for detecting the motor current according to a voltage generated by the resistor R1.

The load circuit receives power from a positive (+V; typically, +12-volt) power line and a ground (GND) power line through the breaker circuit 20. The motor control circuit 7 sequentially turns ON and OFF the transistors Q1 to Q6 to drive the spindle motor 23.

When the spindle motor 23 is driven, a motor current passes through the resistor R1, which generates a terminal voltage corresponding to the motor current. According to this voltage, the current detection circuit 8 detects the motor current and provides the motor control circuit 7 with a feedback signal.

According to the feedback signal, the motor control circuit 7 drives the transistors Q1 to Q6 to rotate the spindle motor 23 at a constant speed.

Figure 9A:
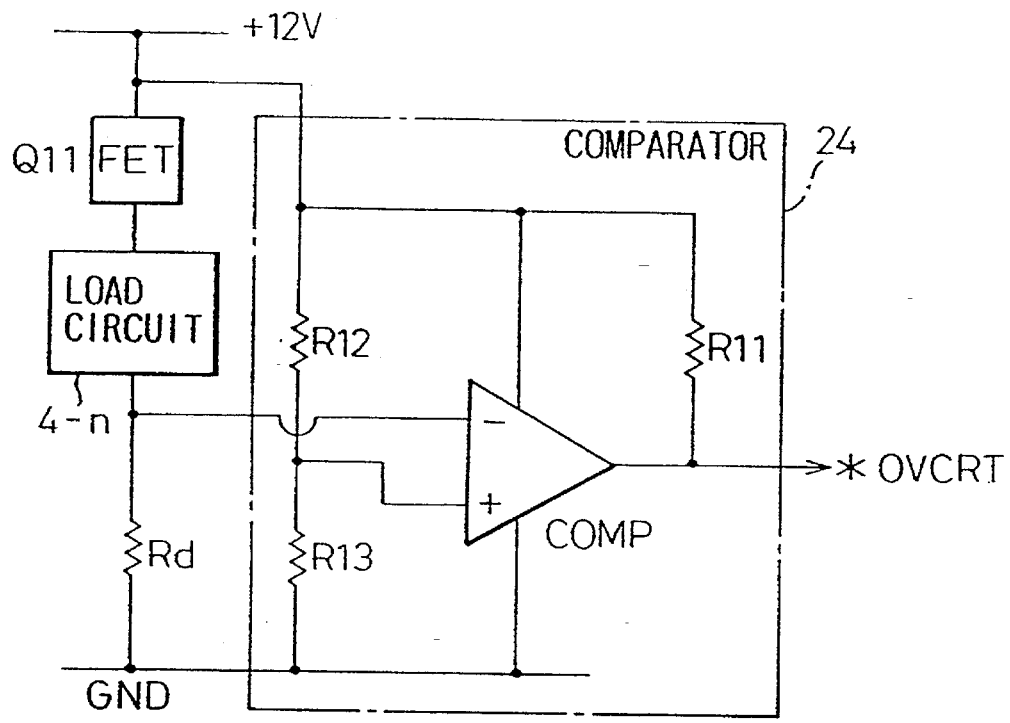
FIG. 9A is a circuit diagram showing in detail a comparator provided in each load circuit of FIG. 8.

FIG. 9A is a circuit diagram showing in detail a comparator provided in each load circuit of FIG. 8. The comparator 24 consists of a comparator element COMP and resistors R11, R12, and R13. The resistors R12 and R13 are connected in series between the +12-volt power line and the ground (GND) power line. The voltage of a node between the resistors R12 and R13 is a reference voltage supplied to the comparator element COMP. The comparator element COMP compares the reference voltage with a voltage from the overcurrent detection resistor Rd and provides the overcurrent detection signal *OVCRT.

Figure 9B:
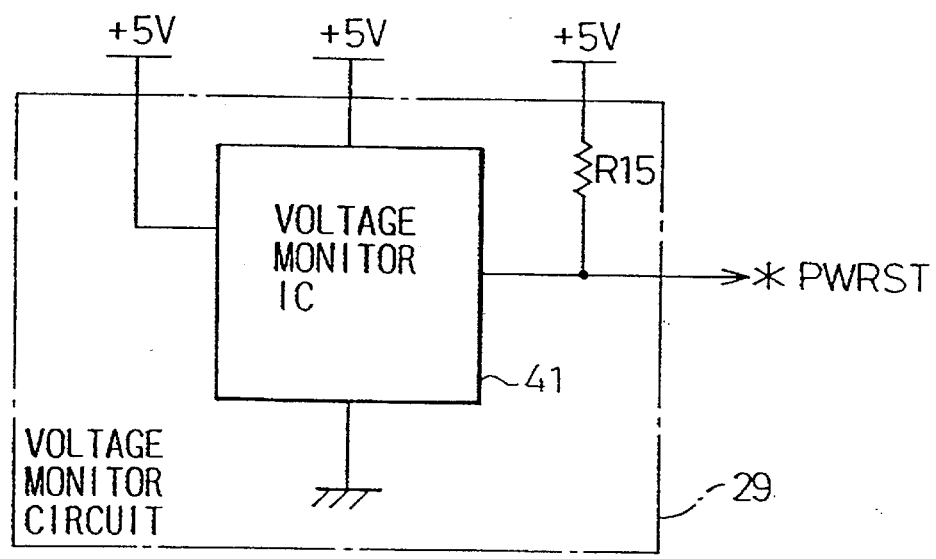
FIG. 9B is a circuit diagram showing in detail a voltage monitor circuit provided in each load circuit of FIG. 8.

FIG. 9B is a circuit diagram showing in detail a voltage monitor circuit provided in each load circuit of FIG. 8.

In FIG. 9B, the voltage monitor circuit 29 has a voltage monitor IC 41 and a resistor R15. The voltage monitor IC 41 detects the voltage of the power lines and determines whether or not a voltage applied to the load circuit is sufficient. The resistor R15 is connected to a +5-volt power line on the output side of the voltage monitor circuit 29.

The voltage monitor circuit 29 monitors the voltage of the +5-volt power line and provides a power reset signal *PWRST indicating whether or not a supply voltage is at a predetermined value. The +5-volt power line is connected to the power source circuit 3.

The power reset signal *PWRST is at a low level ("L") if the supply voltage is lower than the predetermined value and is at a high level ("H") if the supply voltage is equal to the predetermined value.

Figure 10A:
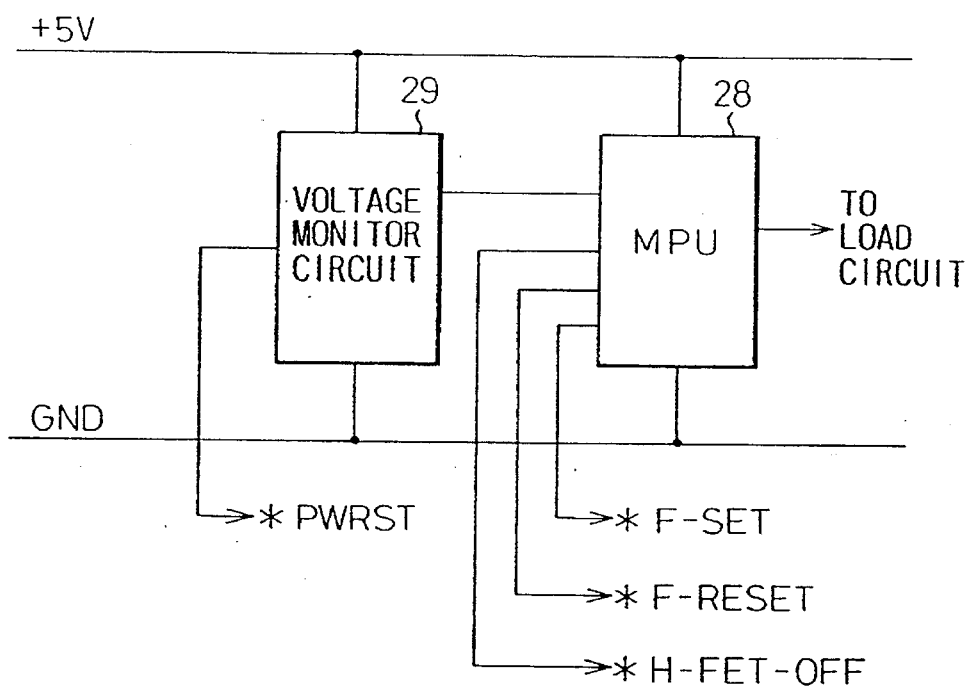
FIG. 10A is a circuit diagram showing in detail a microprocessor unit and a voltage monitor circuit provided in a power supply system of FIG. 7.

FIG. 10A is a circuit diagram showing in detail a microprocessor unit (usually referred to as an MPU) and a voltage monitor circuit provided in a power supply system of FIG. 7. In this case, the MPU 28 is connected to the +5-volt power line and controls the load circuit.

Further, the MPU 28 controls not only the load circuit but also the short-circuit protection controller 21. The MPU 28 provides the short-circuit protection controller 21 with an FF set signal *F-SET for a flip-flop 31 (FF) that will be illustrated in FIG. 10B, an FF reset signal *F-RESET for the same FF 31, and a FET OFF signal *H-FET-OFF for the FET Q11.

The signal *F-SET turns ON the FET Q11, the signal *F-RESET turns OFF the FET Q11, and the signal *H-FET-OFF allows the signal *OVCRT to turn OFF the FET Q11. The signals *F-SET and *F-RESET are each at a high level unless the MPU 28 particularly instructs otherwise. When the MPU 28 issues an instruction, these signals are temporarily changed to a low level but are returned to a high level quickly.

To turn ON the FET Q11, the MPU 28 maintains the signal *F-RESET at a high level and changes the signal *F-SET to a low level.

To turn OFF the FET Q 11, the MPU changes the signal *F-RESET to a low level and maintains the signal *F-SET at a high level. To turn OFF the FET Q11 with the signal *OVCRT being at a low level, the MPU 28 changes the signal *H-FET-OFF to a low level.

Figure 10B:
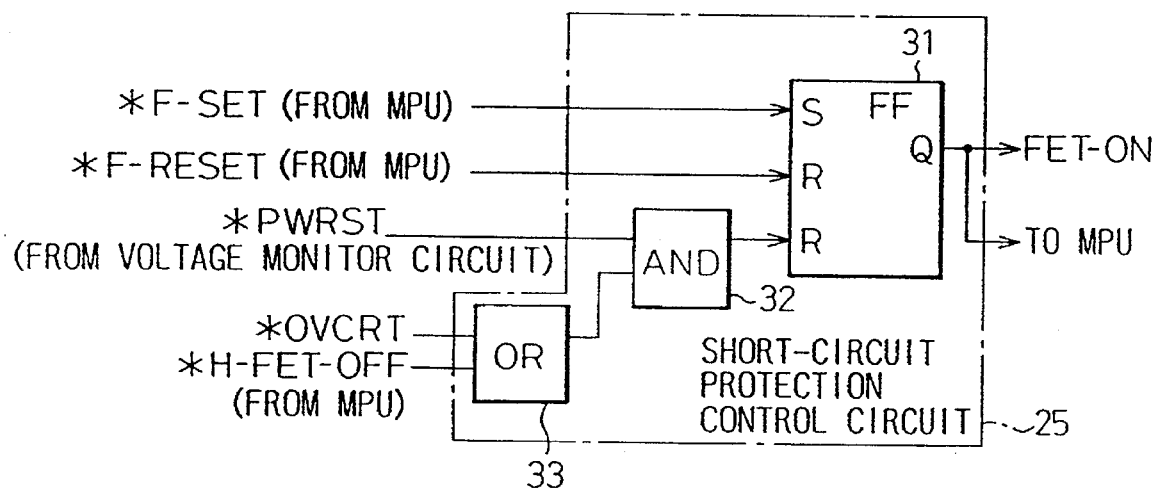
FIG. 10B is a circuit diagram showing in detail a short-circuit protection control circuit provided in each load circuit of FIG. 8.

FIG. 10B iS a circuit diagram showing in detail a short-circuit protection control circuit provided in each load circuit of FIG. 8. This circuit has a flip-flop (FF) 31, an AND circuit 32, and an OR circuit 33.

The OR circuit 33 receives the signal *H-FET-OFF from the MPU 28 and the signal *OVCRT from the comparator 24. The AND circuit 32 receives the output of the OR circuit 33 and the signal *PWRST from the voltage monitor circuit 29.

The flip-flop 31 receives the output of the AND circuit 32, and the signals *F-SET and *F-RESET from the MPU 28.

The flip-flop 31 is set when the signal *F-SET is at a low level, and the Q output at a terminal Q of flip-flop 31 provides the signal FET-ON of a high level.

When the signal *F-RESET is set to a low level and when the output of the AND circuit 32 is at a low level, the flip-flop 31 is reset irrespective of the signal *F-SET, and the Q output thereof provides the signal FET-ON of a low level.

The signal FET-ON from the flip-flop 31 is supplied to the driver 26 and MPU 28.

The operation of the short-circuit protection controller 21 will be explained next. In the following explanation, "H" represents a high level and "L" represents a low level.

(1) If *F-SET="L", *F-RESET="H", *PWRST="H", *OVCRT="H", and *H-FET-OFF="H", the signal FET-ON is "H" to turn ON the FET Q11. Then, the load circuit starts a normal operation.

(2) If the signal *OVCRT changes to "L" from this situation, it will not be accepted. If, however, *-FSET="H" and *F-RESET="L", the signal FET-ON becomes "L". These conditions indicate that the supply voltage is normal and the FET Q11 has been turned OFF to stop the supply of power to the load circuit.

(3) If *F-SET="H", *F-RESET="H", *PWRST="H", and *H-FET-OFF="L", the signal *OVCRT of "L" will not be accepted but it will change the signal FET-ON to "L". This state is an overcurrent detected state. Accordingly, the FET Q11 is turned OFF to stop the supply of power to the load circuit.

The operation of the first preferred embodiment will be explained next.

When the voltage of the power line rises, a current flows to the load circuit through the current limit resistor R6 of the breaker circuit 20, to gradually increase the voltage of the load circuit. When the MPU 28 issues the signal *F-SET of a low level, the short-circuit protection controller 21 issues the signal FETON of a high level, and therefore, the driver 26 turns ON the FET Q11 of the breaker circuit 20.

Once the FET Q11 is turned ON, the current bypasses the current limit resistor R6 to the load circuit. As a result, the voltage of the load circuit rises to the predetermined value to start a normal operation.

If a short-circuit failure occurs in the load circuit, an overcurrent flows through the overcurrent detection resistor Rd, and the short-circuit protection controller 21 issues the signal FET-ON of a low level to turn OFF the FET Q11 of the breaker circuit 20. As a result, the supply of power to the load circuit is stopped.

In this way, the FET Q11 of the breaker circuit 20 connected to the power line is turned OFF if a short-circuit failure occurs in the load circuit, to stop the supply of power to the load circuit. The operation for turning OFF the FET Q11 is carried out at higher speed than the melting of a fuse.

Accordingly, the other load circuits will not be adversely affected by a voltage drop or fluctuation when the power line is cut off from the failed load circuit.

The first preferred embodiment detects an overcurrent that is produced by a short-circuit failure. Instead, it is possible to detect an abnormal current that is out of a range specified by the MPU 28, to turn OFF the FET Q11 and cut off the power line from the load circuit.

FIGS. 11 to 16 show the circuit configuration of a power supply system according to the second preferred embodiment of the present invention.

Figure 11:
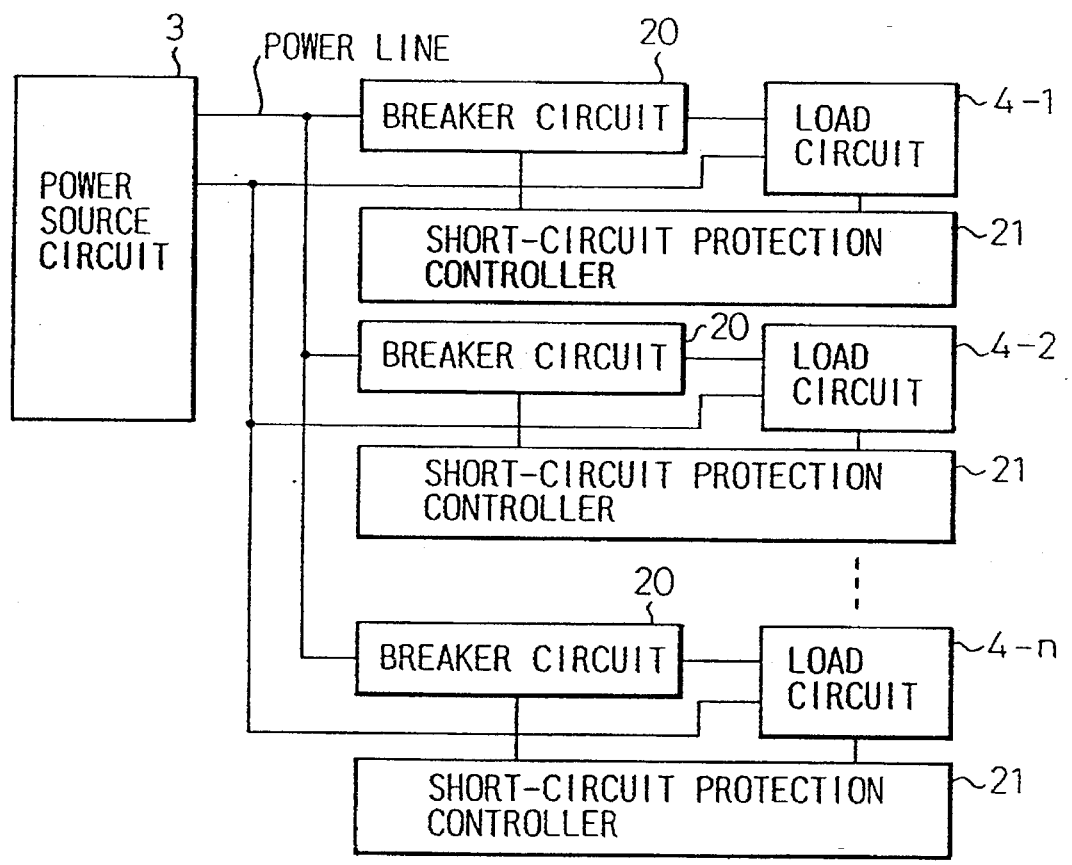
FIG. 11 is a block diagram showing a power supply system according to a second preferred embodiment of the present invention.

More specifically, FIG. 11 is a block diagram showing the whole configuration of a power supply system according to the second preferred embodiment.

As shown in FIG. 11, the second preferred embodiment employs a current detection resistor in each load circuit. This resistor serves as the overcurrent detection resistor Rd of the first preferred embodiment.

The other arrangements of the second preferred embodiment are the same as those of the first preferred embodiment.

The power supply system of the second preferred embodiment includes a power source circuit 3 and load circuits 4-1 to 4-n. The load circuits 4-1 to 4-n are connected in parallel with the power source circuit 3 through respective power lines. Each of the power lines is provided with a breaker circuit 20 for cutting off the power line from the corresponding load circuit in response to an overcurrent.

Each load circuit is provided with a short-circuit protection controller 21 for controlling the breaker circuit 20 according to an overcurrent detection signal from the resistor in the load circuit. When the short-circuit protection controller 21 detects an overcurrent in the corresponding load circuit, it provides the breaker circuit 20 with a control signal to cut off the corresponding power line from the load circuit.

In this way, the power supply system of the second preferred embodiment consists of groups of the load circuit, breaker circuit 20, and short-circuit protection controller 21, to protect the load circuits group by group against a short-circuit failure.

Each of the load circuits may be a magnetic disk unit, a spindle motor drive circuit, or a voice coil motor (VCM) drive circuit. The breaker circuit 20 employs, instead of a conventional fuse, a high-speed semiconductor breaker element such as a field effect transistor (FET).

During a normal operation, the breaker circuit 20 is closed in the power line, to supply power from the power source circuit 3 to the corresponding load circuit. If a short-circuit failure occurs in any one of the load circuits, an overcurrent flows to the corresponding power line, and the overcurrent detection resistor in the load circuit generates a voltage corresponding to the overcurrent.

As soon as detecting this voltage, the short-circuit protection controller 21 sends a control signal to the breaker circuit 20, which cuts off the power line from the load circuit, to prevent a voltage fluctuation in the other load circuits.

Figure 12:
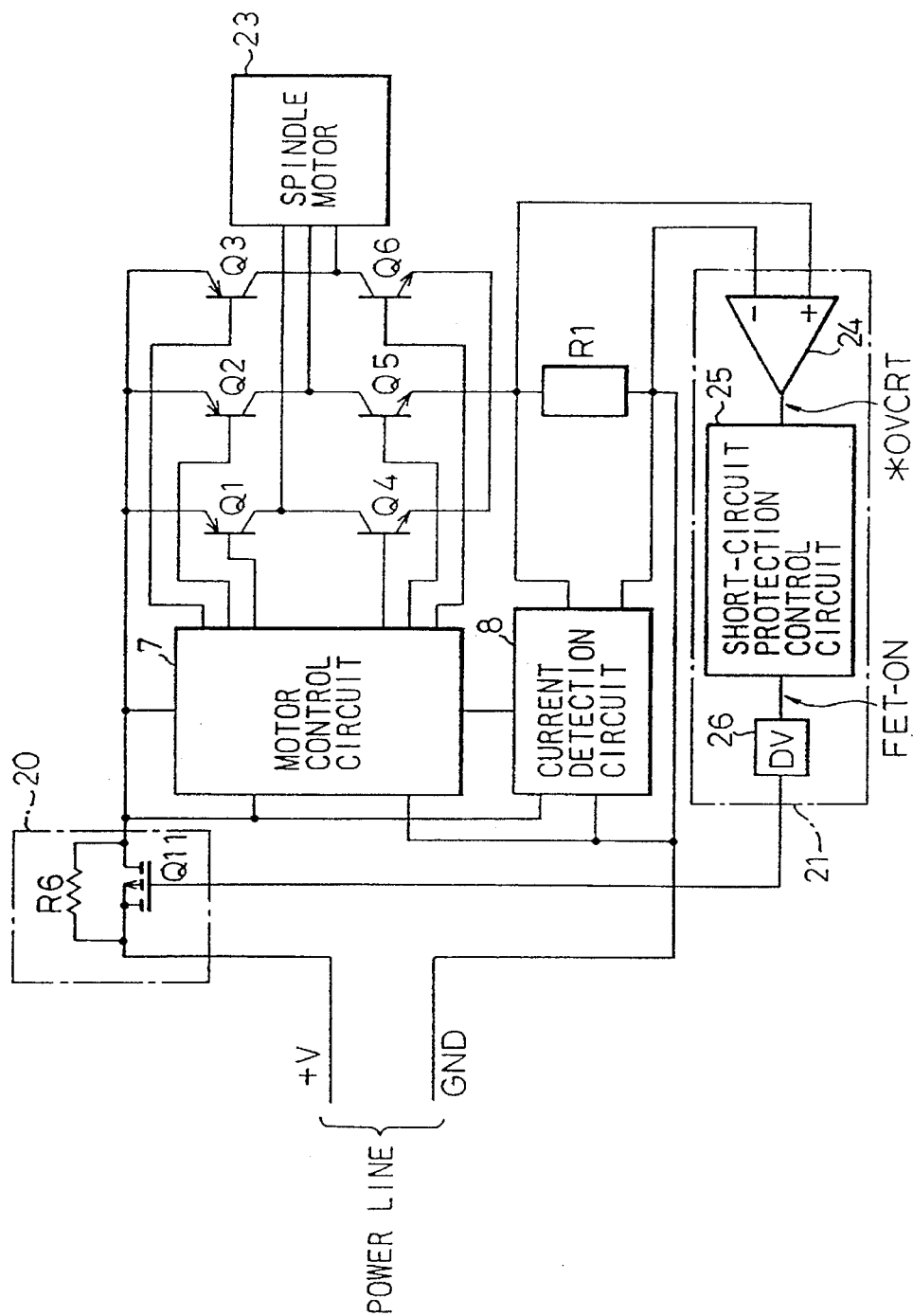
FIG. 12 is a circuit diagram showing a first example of one of a plurality of load circuits provided in a power supply system of FIG. 11.

FIG. 12 is a circuit diagram showing a first example of one of a plurality of load circuits provided in a power supply system of FIG. 11. Namely, FIG. 12 shows the details of one (e.g., a load circuit 4-n) of the load circuits of FIG. 11.

In FIG. 12, the load circuit 4-n includes a spindle motor drive circuit for driving a spindle motor 23 of a magnetic disk unit. The breaker circuit 20 has a field effect transistor (FET) Q11 and a current limit resistor R6. The short-circuit protection controller 21 has a comparator 24, a short-circuit protection control circuit 25, and a driver (DV) 26.

The load circuit has the current detection resistor R1 that serves as the overcurrent detection resistor Rd of the first preferred embodiment of FIGS. 7 and 8. A voltage generated by the resistor R1 is used as an overcurrent detection signal, which is supplied to the comparator 24.

The other arrangements and operations of the second preferred embodiment are the same as those of the first preferred embodiment, and therefore, they are not explained again.

Figure 13:
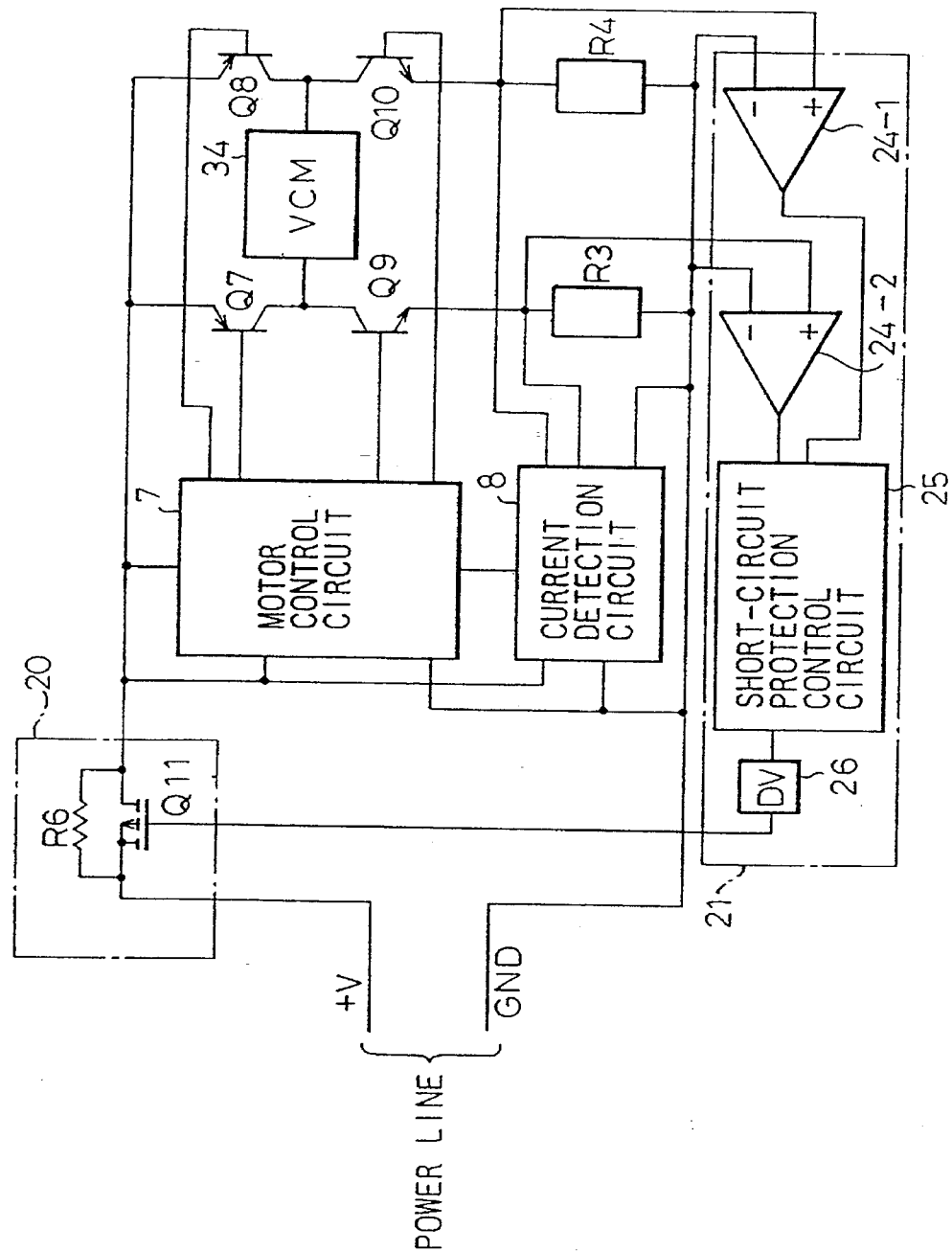
FIG. 13 is a circuit diagram showing a second example of one of a plurality of load circuits provided in a power supply system of FIG. 11.

FIG. 13 is a circuit diagram showing a second example of one of a plurality of load circuits provided in a power supply system of FIG. 11. Namely, FIG. 13 shows the details of one (e.g., a load circuit 4-n) of the load circuits of FIG. 11.

In this example, the load circuit 4-n has a VCM drive circuit for driving a VCM (voice coil motor) 34 of a magnetic disk unit. The breaker circuit 20 has a FET Q11 and a current control resistor R6. The short-circuit protection controller 21 has comparators 24-1 and 24-2, a short-circuit protection control circuit 25, and a driver (DV) 26.

The VCM drive circuit has transistors Q7 to Q10 for driving the VCM 34, a motor control circuit 7 for controlling the transistors, current detection resistors R3 and R4 for detecting a motor current, and a current detection circuit 8 for detecting the motor current according to voltages generated by the resistors R3 and r4.

The current detection resistors R3 and R4 serve as overcurrent detection resistors. Voltages generated by the resistors R3 and R4 are used as overcurrent detection signals and are supplied to the comparators 24-1 and 24-2.

The load circuit receives power from the positive (+V) and ground (GND) power lines through the breaker circuit 20. The motor control circuit 7 sequentially turns ON and OFF the transistors Q7 to Q10, to drive the VCM 34.

When the VCM 34 is driven, a motor current passes through the current detection resistors R3 and R4, which generate voltages corresponding to the motor current. These voltages are supplied to the current detection circuit 8, which detects the motor current and issues a feedback signal to the motor control circuit 7.

According to the feedback signal, the motor control circuit 7 drives the transistors to drive the VCM 34. The other arrangements of this example are the same as those of the first preferred embodiment, and therefore, they are not explained again.

Figure 14:
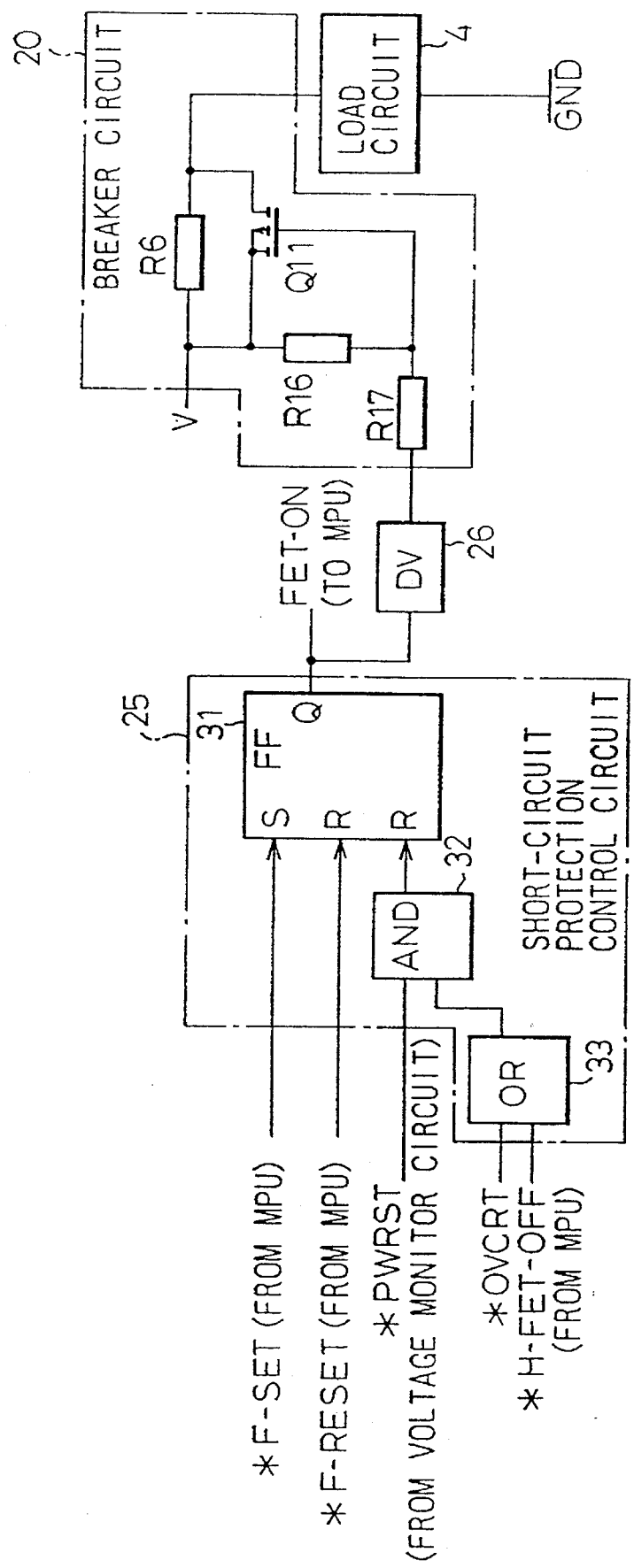
FIG. 14 is a circuit diagram showing in detail a breaker circuit and a short-circuit protection control circuit provided in a power supply system of FIG. 12.

FIG. 14 is a circuit diagram showing in detail a breaker circuit and a short-circuit protection control circuit provided in a power supply system of FIG. 12.

In FIG. 14, the breaker circuit 20 has the FET Q11, the current limit resistor R6, and resistors R16 and R17. The current limit resistor R6 is in parallel with the FET Q11, to limit a current flowing to the load circuit 4 when the FET Q11 is OFF. The resistors R16 and R17 are bias resistors for the FET Q11.

The short-circuit protection control circuit 25 has a flip-flop (FF) 31, an AND circuit 32, and an OR circuit 33. The short-circuit protection control circuit 25 is the same as that of the first preferred embodiment, and therefore, it is not explained again.

Figure 15A:
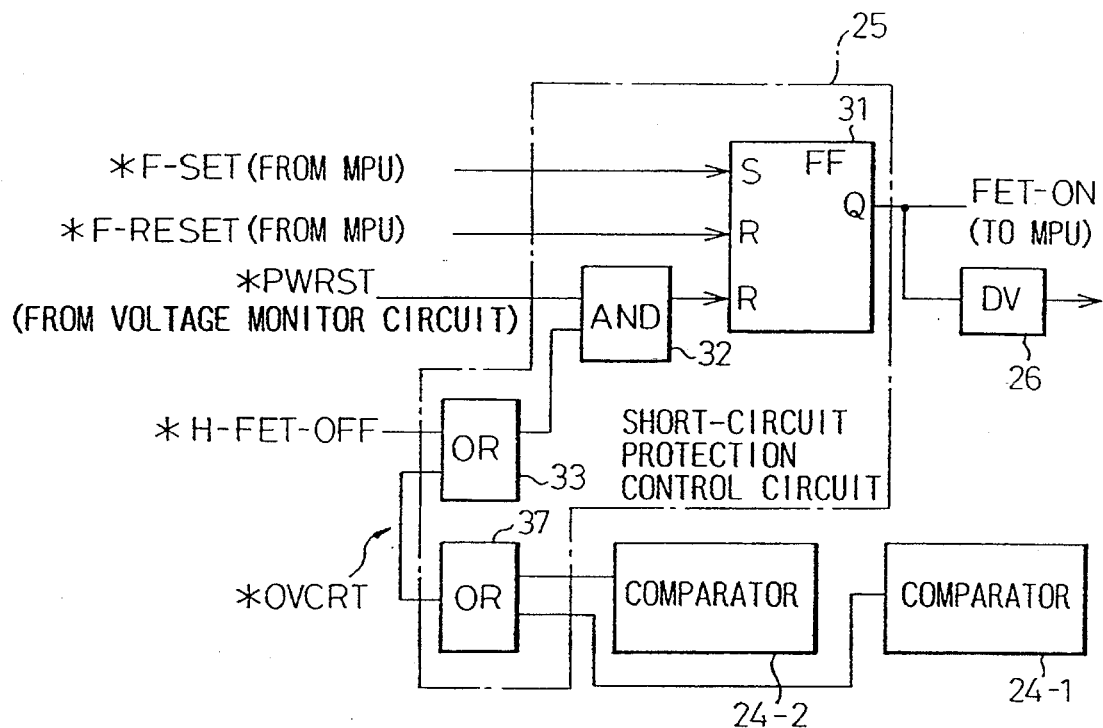
FIG. 15A is a circuit diagram showing in detail a short-circuit protection control circuit of FIG. 14.

FIG. 15A is a circuit diagram showing in detail a short-circuit protection control circuit of FIG. 14.

In FIG. 15A, comparators 24-1 and 24-2 provide overcurrent detection signals whose OR output (logical sum output) is used as the overcurrent detection signal *OVCRT. The short-circuit protection control circuit 25 has the flip-flop 31, the AND circuit 32, the OR circuit 32, and an OR circuit 37.

The OR circuit 37 receives the overcurrent detection signals from the comparators 24-1 and 24-2, and the output of the OR circuit 37 is connected to the OR circuit 33.

The OR circuit 33 provides the AND circuit 32 with an OR of the overcurrent detection signal *OVCRT from the OR circuit 37 and a FET OFF signal *H-FET-OFF from an MPU 28. The other arrangements are the same as those of FIG. 14 mentioned before, and therefore, they are not explained again.

Figure 15B:
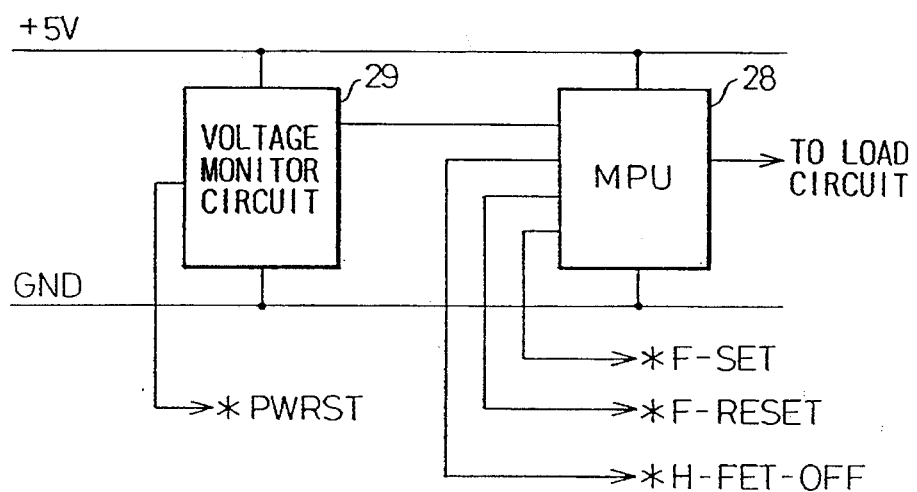
FIG. 15B is a circuit diagram showing in detail a microprocessor unit and a voltage monitor circuit provided in a power supply system of FIG. 11.

FIG. 15B is a circuit diagram showing in detail an MPU and a voltage monitor circuit provided in a power supply system of FIG. 11.

In FIG. 15B, the voltage monitor circuit 29 and MPU 28 are connected to a +5-volt power line that is different from the power line to the load circuit. The voltage monitor circuit 29 and MPU 28 are the same as those of the first preferred embodiment, and therefore, they are not explained again.

Figure 16:
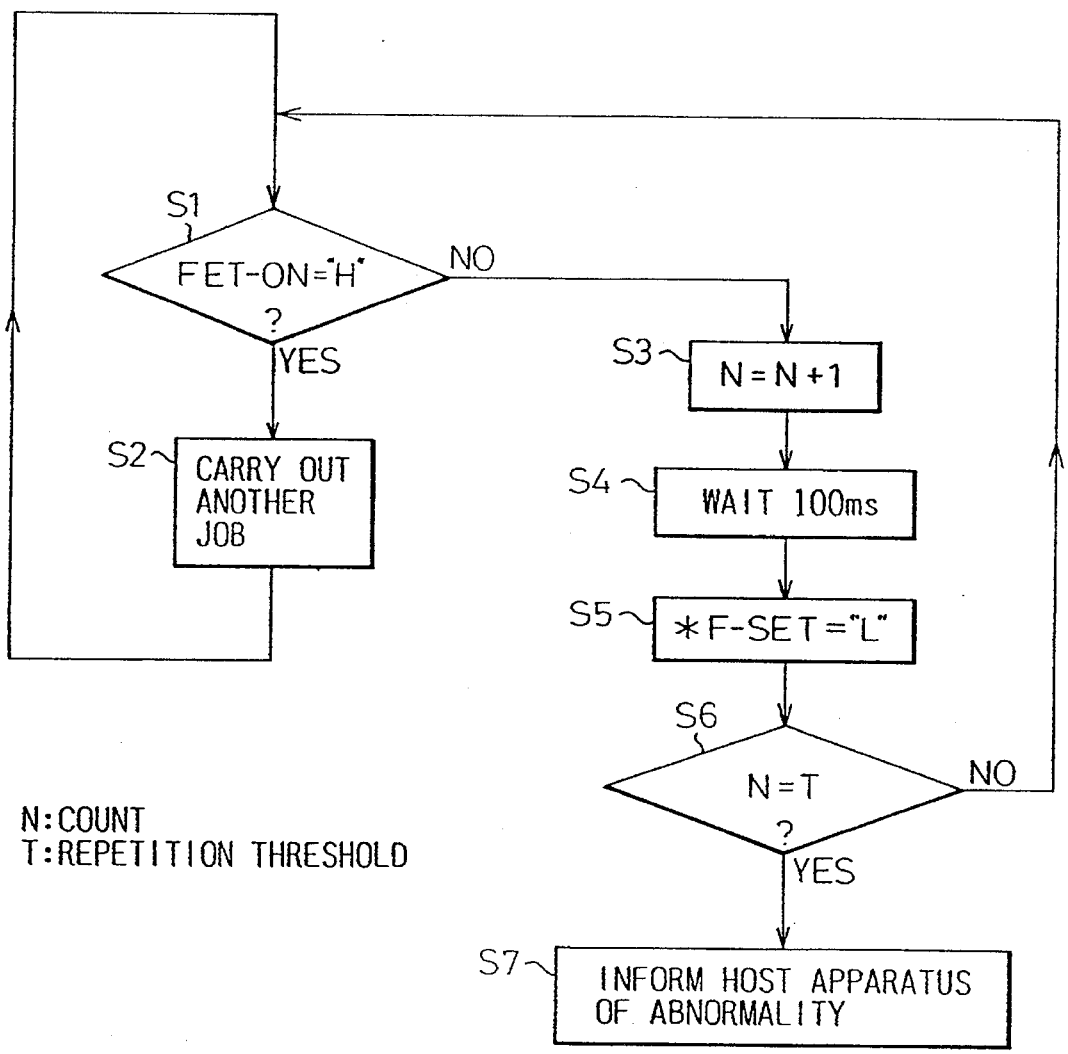
FIG. 16 is a flowchart for explaining the operation of a power supply system according to a second preferred embodiment of the present invention.

FIG. 16 is a flowchart for explaining the operation of a power supply system according to a second preferred embodiment of the present invention. In FIG. 16, reference marks S1 to S7 indicate steps, N is a count of a counter arranged in the MPU, and T is a repetition threshold, for example, T=4.

The steps of FIG. 16 are carried out under the control of the MPU 28, to prevent an error in detecting an overcurrent. More precisely, a power line to a load circuit is once cut off from the load circuit according to the overcurrent detection signal *OVCRT, and the FET Q11 is again turned ON to confirm that the overcurrent really flows.

In step S1, the MPU 28 determines whether or not the signal FET-ON from the short-circuit protection control circuit 25 is at a high level. If it is at a high level, the FET Q11 is ON to carry out a normal operation, so that the MPU 28 carries out another job in step S2.

If the signal FET-ON is at a low level, the FET Q11 is OFF, and the corresponding power line is cut off from the corresponding load circuit due to an overcurrent caused by a short-circuit failure.

When the MPU 28 detects this state, it increases the count (N=N+1) in step S3, and waits, for example, 100 milliseconds (ms) in step S4.

In step S5, the MPU 28 sets the signal *F-SET to a low level to turn ON the FET Q11. In step S6, the MPU 28 determines whether or not the count N is equal to the repetition threshold T.

If the count N is below the repetition threshold T, the flow returns to the step S1. If N=T, it is determined that there is no error in detecting the overcurrent and that the FET Q11 has been turned OFF due to the overcurrent. Accordingly, the MPU 28 informs a host apparatus of the short-circuit failure in step S7.

If the signal FET-ON changes to a high level before the count N reaches the repetition threshold T, it is determined that the FET has been temporarily turned OFF due to some reason other than a short-circuit failure.

In this way, the MPU 28 prevents an error in detecting an overcurrent by repeatedly turning ON the FET Q11 for a predetermined number of times for a predetermined period after the FET Q11 is turned OFF to cut off the power line from the load circuit.

FIGS. 17 to 22 show the circuit configuration of a power supply system according to a third preferred embodiment of the present invention.

Figure 17:
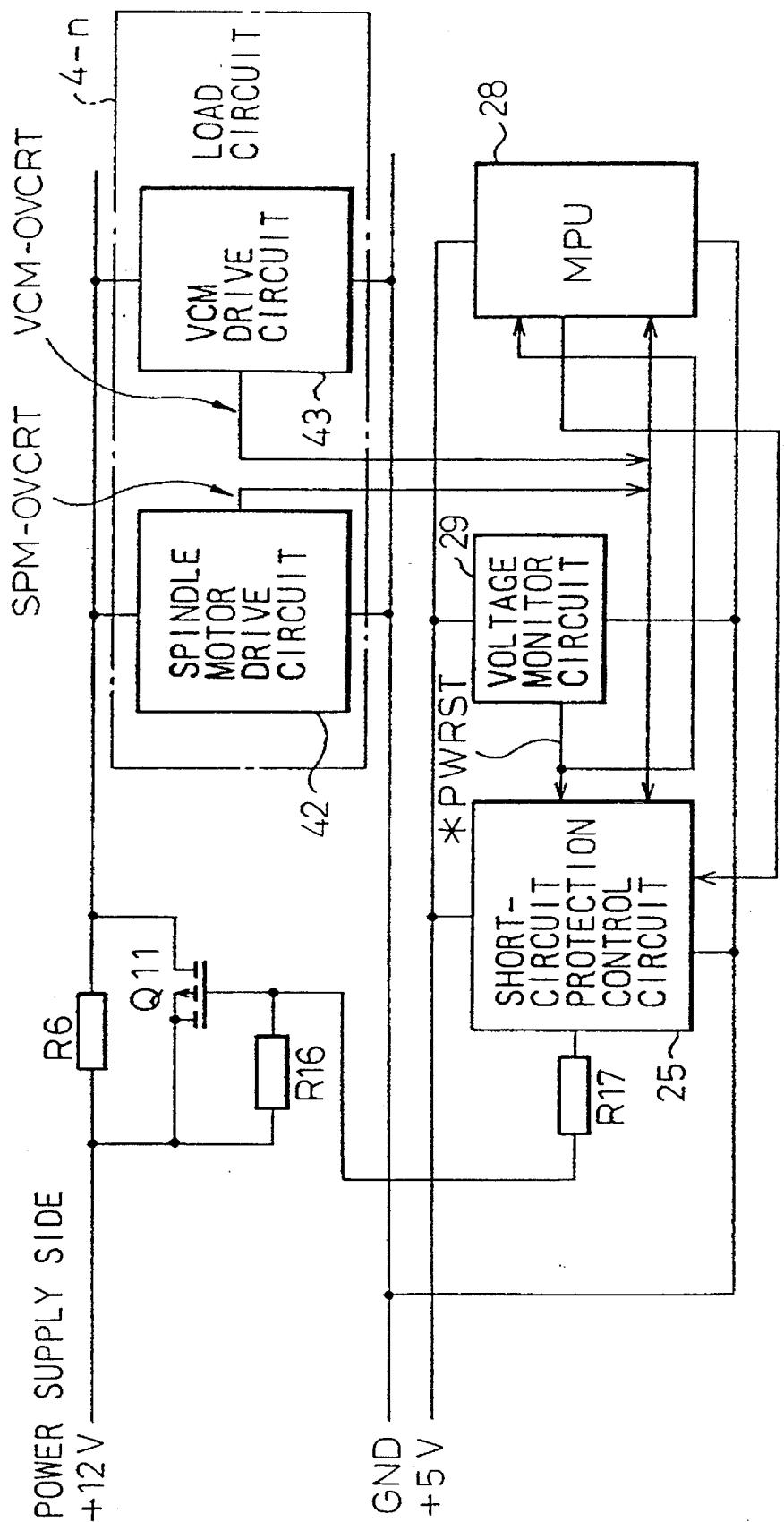
FIG. 17 is a block diagram showing a power supply system according to a third preferred embodiment of the present invention.

More specifically, FIG. 17 is a block diagram showing the whole configuration of a power supply system according to the third preferred embodiment.

As shown in FIG. 17, the third preferred embodiment arranges a spindle motor drive circuit 42 and a VCM drive circuit 43 in one (for example, a load circuit 4-n) of the load circuits of FIG. 11.

The spindle motor drive circuit 42 is the same as that of FIG. 12, and the VCM drive circuit 43 is the same as that of FIG. 13. Namely, the third preferred embodiment arranges the load circuits of FIGS. 12 and 13 in one load circuit, to share a breaker circuit 20 and a short-circuit protection controller 21.

If a short-circuit failure occurs in one of the spindle motor drive circuit 42 and VCM drive circuit 43, a magnetic disk unit driven by these circuits becomes entirely unusable. Accordingly, the third preferred embodiment cuts off power lines from both of the two kinds of drive circuits.

Referring to FIG. 17, the breaker circuit is connected to a +12-volt power line. The breaker circuit consists of a FET Q11, a current control resistor R6, a bias resistor R16, etc.

The load circuit 4-n is connected to the +12-volt power line through the breaker circuit. The load circuit 4-n includes the spindle motor drive circuit 42 and VCM drive circuit 43.

A +5-volt power line is connected to an MPU 28, a voltage monitor circuit 29, and a short-circuit protection control circuit 25. A driver is not shown in the figure.

The spindle motor drive circuit 42 provides an overcurrent detection signal SPM-OVCRT, and the VCM drive circuit 43 provides an overcurrent detection signal VCM-OVCRT.

The spindle motor drive circuit 42 incorporates the comparator 24 of FIG. 12. The output of the comparator 24 is inverted by an inverter and forms the overcurrent detection signal SPM-OVCRT. This signal SPM-OVCRT is at a high level when detecting an overcurrent and at a low level under a normal state.

The VCM drive circuit 43 incorporates the comparators 24-1 and 24-2 of FIG. 13. An OR output (logical sum output) of the output signals from the comparators 24-1 and 24-2 is inverted to form the overcurrent detection signal VCM-OVCRT. This signal is at a high level when detecting an overcurrent and at a low level under a normal state.

The overcurrent detection signals SPM-OVCRT and VCM-OVCRT are sent to the short-circuit protection control circuit 25. The other arrangements of the third preferred embodiment are the same as those of the second preferred embodiment, and therefore, they are not explained again.

Figure 18:
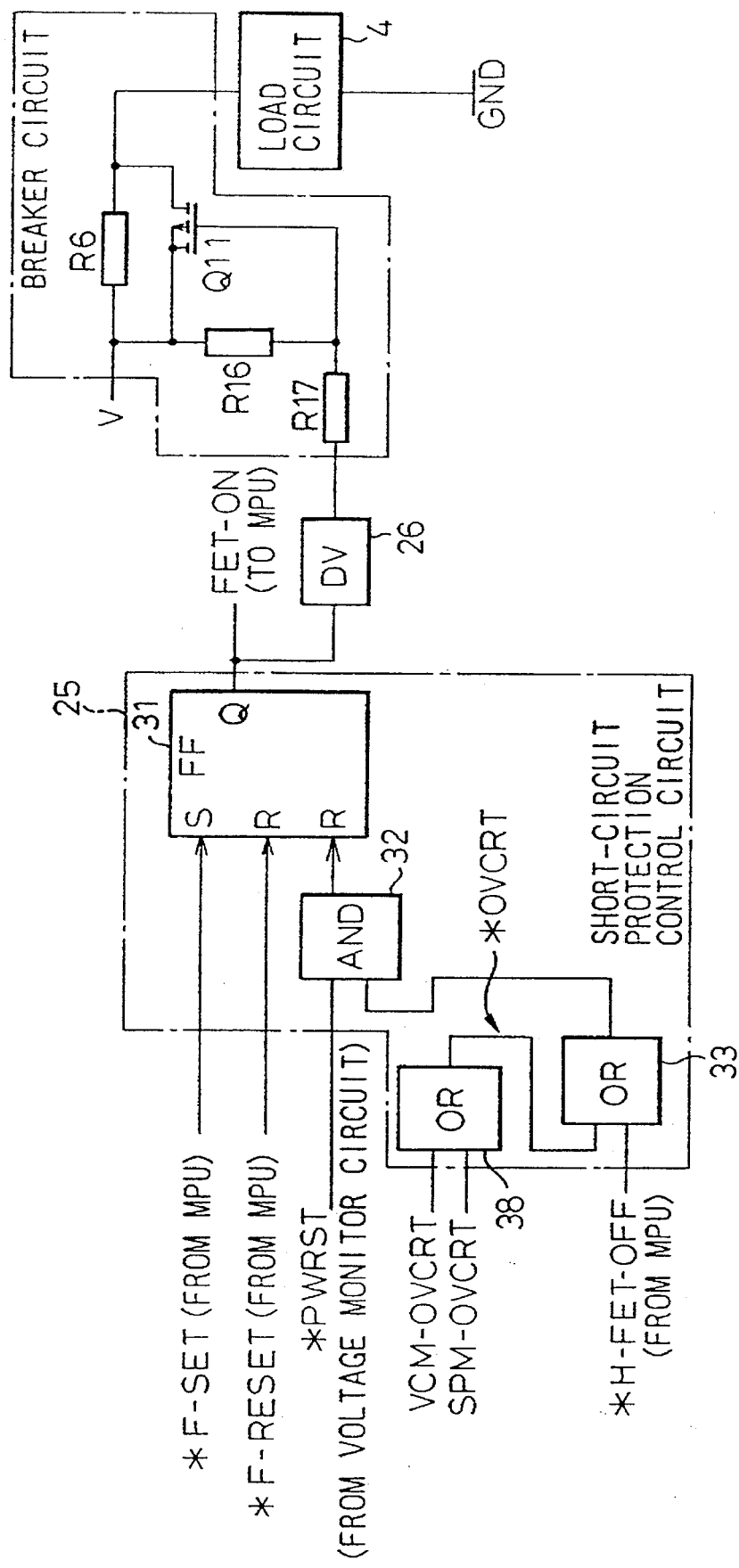
FIG. 18 is a circuit diagram showing in detail a short-circuit protection control circuit provided in a power supply system of FIG. 17.

FIG. 18 is a circuit diagram showing in detail a short-circuit protection control circuit provided in a power supply system of FIG. 17.

The short-circuit protection control circuit 25 includes a flip-flop (FF) 31, an AND circuit 32, an OR circuit 33, and an OR circuit 38. The OR circuit 38 receives the overcurrent detection signals SPM-OVCRT and VCM-OVCRT. An OR signal from the OR circuit 38 is inverted to form an overcurrent detection signal *OVCRT, which is sent to the OR circuit 33.

The OR circuit 33 provides the AND circuit 32 with an OR of the output signal of the OR circuit 38 and the FET OFF signal *H-FET-OFF. The other arrangements of the short-circuit protection control circuit 25 are the same as those of the circuit 25 of the second preferred embodiment, and therefore, they are not explained again.

Figure 19:
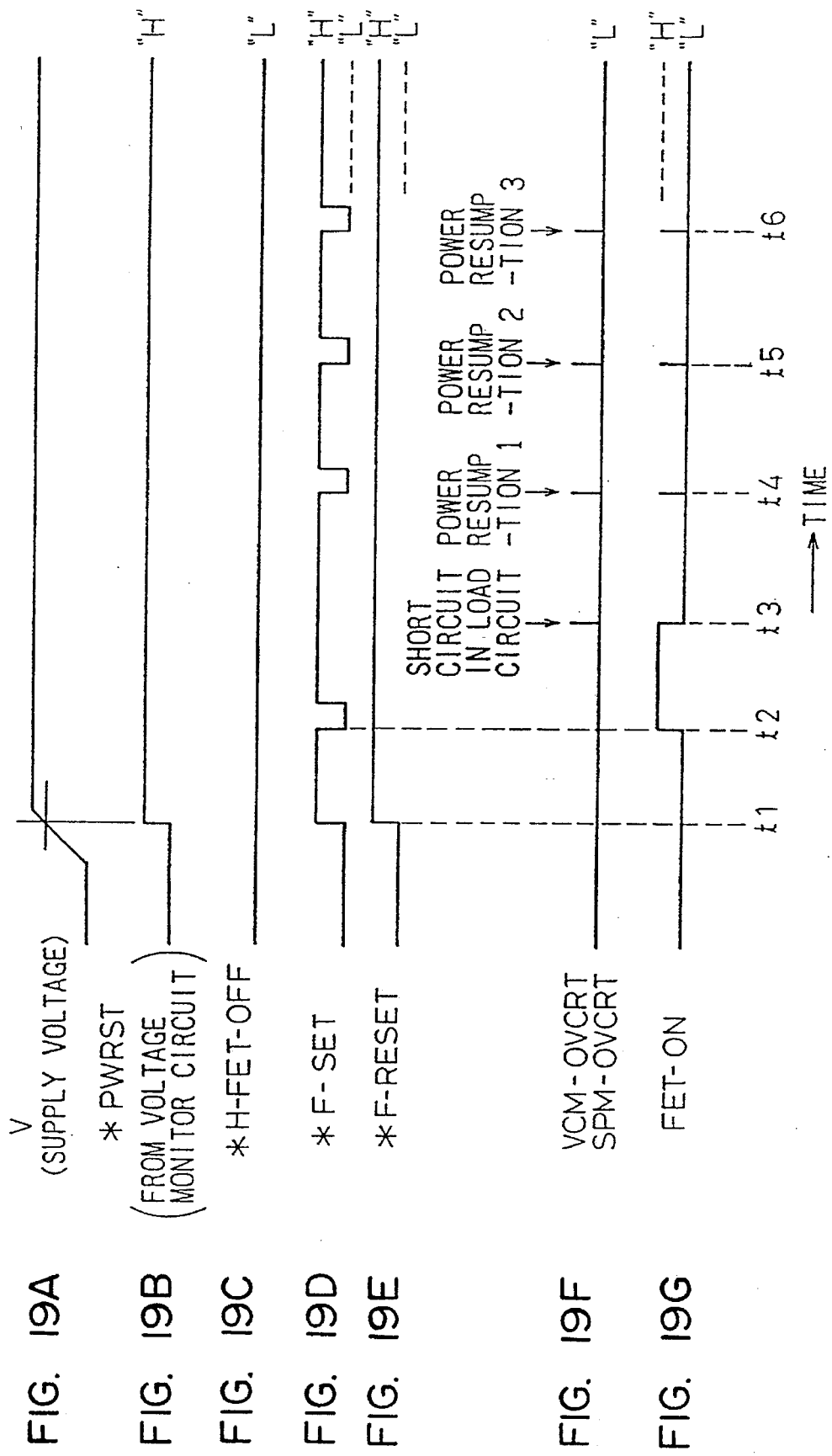
FIG. 19 is a time chart for explaining a first example of the operation of a power supply system according to a third preferred embodiment of the present invention.

FIG. 19 is a time chart for explaining a first example of the operation of a power supply system according to a third preferred embodiment of the present invention.

To prevent an error in detecting an overcurrent, the third preferred embodiment once cuts off a power line from a load circuit in response to an overcurrent detection signal, and again turns ON the FET Q11 to confirm that the overcurrent surely flows. This operation is carried out under the control of the MPU 28.

At the timing corresponding to time t1, a supply voltage V indicated with (a) in a power line rises to a predetermined value. The power reset signal *PWRST indicated with (b) from the voltage monitor circuit 29 changes to a high level ("H"). At this time, the FET OFF signal *H-FET-OFF indicated with (c) from the MPU 28 is at a low level ("L"), the FF set signal *F-SET indicated with (d) from the MPU 28 changes to a high level, the FF reset signal *F-RESET indicated with (e) from the MPU 28 changes to a high level, and the overcurrent detection signals VCM-OVCRT and SPM-OVCRT indicated with (f) are each at a low level. As a result, the signal FET-ON indicated with (g) from the short-circuit protection control circuit 25 is set to a low level to turn OFF the FET Q11.

At the timing corresponding to time t2, the signal *F-SET of (d) is set to a low level, to set the flip-flop 31 to change the signal FET-ON of (g) to a high level. As a result, the FET Q11 is turned ON to start the supply of power to the load circuit. In this state, the load circuit carries out a normal operation. At the timing corresponding to time t3, a short-circuit failure occurs.

One of the overcurrent detection signals SPM-OVCRT and VCM-OVCRT corresponding to the circuit that has caused the short-circuit failure changes to a high level. Accordingly, the signal FET-ON of (g) is set to a low level to turn OFF the FET Q11, thereby cutting off the power supply. This situation is informed to the MPU 28.

The MPU 28 waits a predetermined period, and at timing t4, sets the signal *F-SET of (d) to a low level to again turn ON the FET Q11. If the overcurrent still flows, the signal VCM-OVCRT or SPM-OVCRT is at a high level. As a result, the flip-flop 31 is reset according to the output of the AND circuit 32, to set the signal FET-ON to a low level.

In this way, if the FET Q11 is turned OFF after detecting an overcurrent, the FET Q11 is again turned ON to resume the power supply, to confirm that the overcurrent surely flows. This prevents an error in detecting the overcurrent.

The FET Q11 is repeatedly turned ON several times at intervals of, for example, 100 milliseconds. Namely, it is turned ON at the timing corresponding to time t4 for the first time, at the timing corresponding to time t5 for the second time, and at the timing corresponding to time t6 for the third time.

Figure 20:
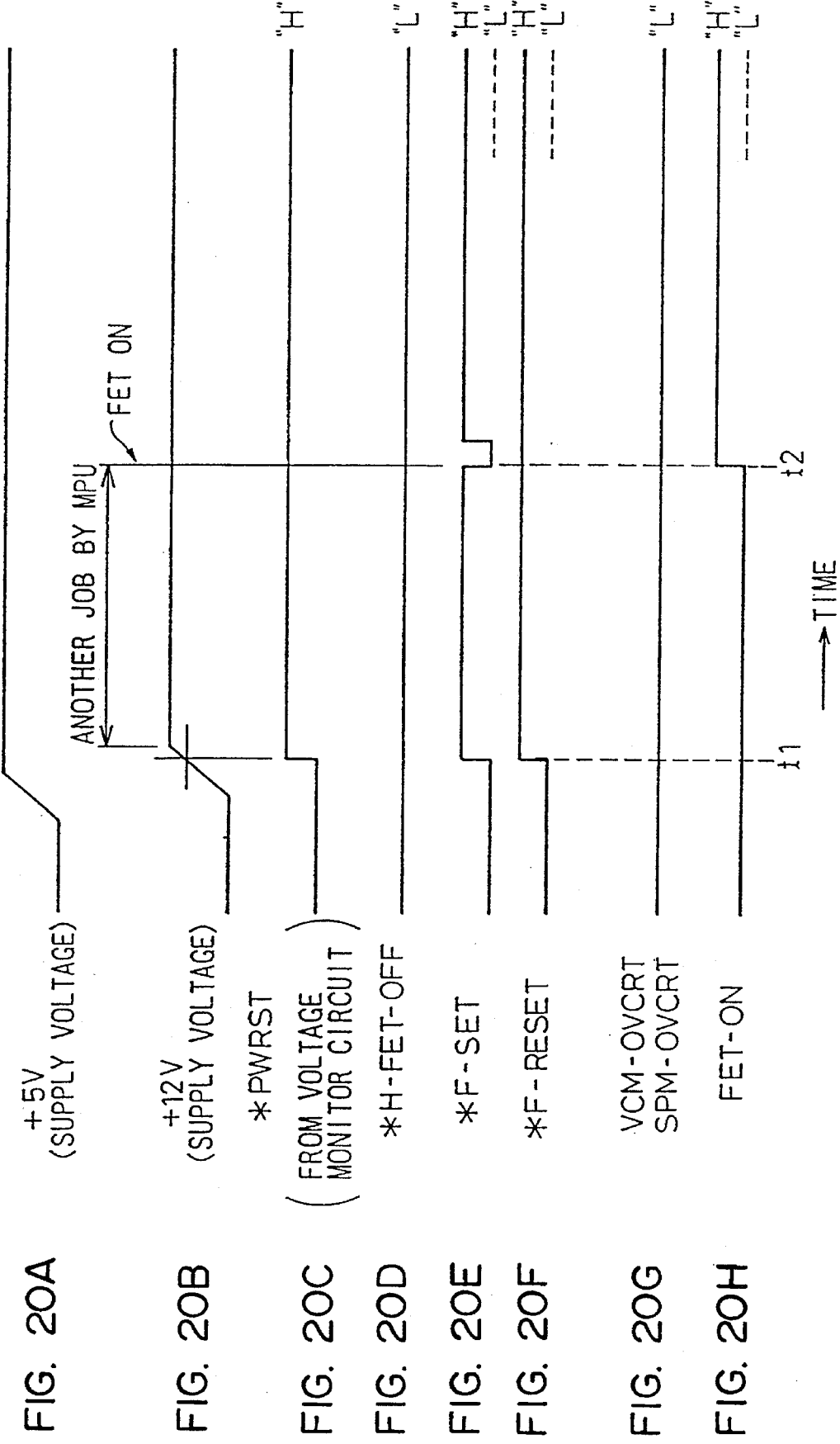
FIG. 20 is a time chart for explaining a second example of the operation of a power supply system according to a third preferred embodiment of the present invention.

FIG. 20 is a time chart for explaining a second example of the operation of a power supply system according to a third preferred embodiment of the present invention.

This operation is carried out under the control of the MPU 28, to turn ON the FET Q11 after the voltage monitor circuit 29 indicates that a supply voltage is sufficient.

At the timing corresponding to time t1, the voltage of the +5-volt power line indicated with (a) increases to a predetermined value, and the voltage of the +12-volt power line indicated with (b) increases to a predetermined value. The power reset signal *PWRST of (c) changes to a high level ("H").

At this time, the signal *H-FET-OFF of (d) is at a low level ("L"), the signal *F-SET of (e) changes to a high level, the signal *F-RESET of (f) changes to a high level, and the signals VCM-OVCRT and SPM-OVCRT of (g) are each at a low level. As a result, the signal FET-ON of (h) is set to a low level to turn OFF the FET Q11. In this state, the MPU 28 executes another job.

When the voltage monitor circuit 29 indicates that the power source has been completely activated at the timing corresponding to time t2, the MPU 28 sets the signal *F-SET of (e) to a low level. Then, the signal FET-ON of (h) changes to a high level to turn ON the FET Q11.

FIGS. 21 to 25 show a power supply system according to a fourth preferred embodiment of the present invention.

Figure 21:
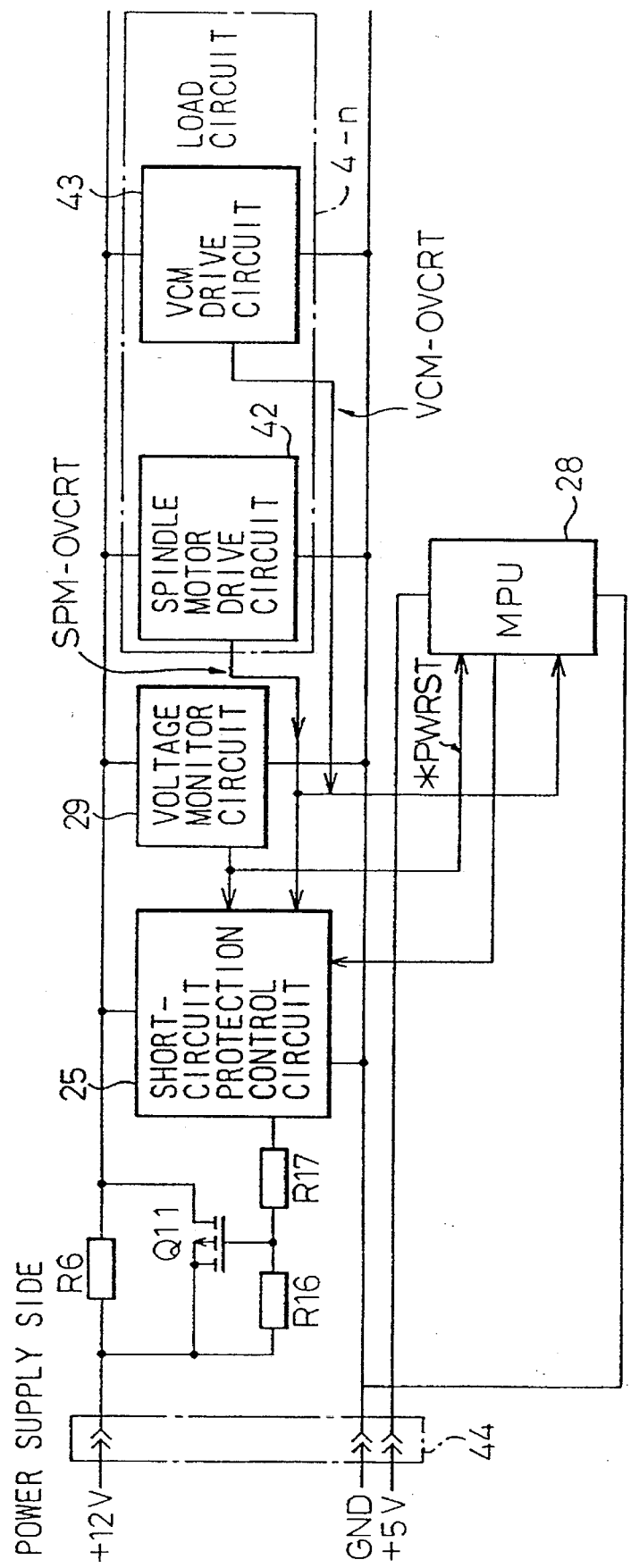
FIG. 21 is a block diagram showing a power supply system according to a fourth preferred embodiment of the present invention.

More specifically, FIG. 21 is a block diagram showing a power supply system according to the fourth preferred embodiment.

A +12-volt power line is connected to a breaker circuit, which is connected to a load circuit 4-*n*, a short-circuit protection control circuit 25, and a voltage monitor circuit 29. A +5-volt power line is connected to an MPU 28.

A connector 44 is arranged on a printed board on which the load circuit is formed. The connector 44 may be connected to the power lines and disconnected from these power lines. A capacitor (not shown) is connected in parallel with the load circuit.

The functions of the respective parts of the fourth preferred embodiment are the same as those of the third preferred embodiment of FIG. 17, and therefore, they are not explained again. The details of the short-circuit protection control circuit 25 are the same as those of the circuit 25 of the third preferred embodiment of FIG. 18, and therefore, they are not repeatedly explained. The following explanation will also be made with reference to FIGS. 17 and 18.

FIG. 22 is a time chart for explaining a first example of the operation of a power supply system according to a fourth preferred embodiment of the present invention.

This operation initializes the MPU 28 at first and then turns ON the FET Q11. The MPU 28 for controlling the load circuit is connected to the +5-volt power line that is different from the +12-volt power line connected to the short-circuit protection control circuit 25.

At the timing corresponding to time t1, the voltage of the +5-volt power line represented with (a) rises to a predetermined value. Then, the MPU 28 carries out initialization and executes another job. At the timing corresponding to time t2, the voltage of the +12-volt power line represented with (b) rises to a predetermined value, and the voltage monitor circuit 29 indicates that the power source has been completely activated. At this time, the power reset signal *PWRST of (c) changes to a high level ("H"), and the signal *H-FET-OFF of (d) is at a low level ("L"). Then, the MPU 28 sets an FF set signal *F-SET represented with (e) to a low level.

Further, the signal *F-RESET of (f) changes to a high level, and the signals VCM-OVCRT and SPM-OVCRT of (g) are each at a low level. Accordingly, a FET ON signal FET-ON represented with (h) changes to a high level to turn ON the FET Q11.

Figure 23A:
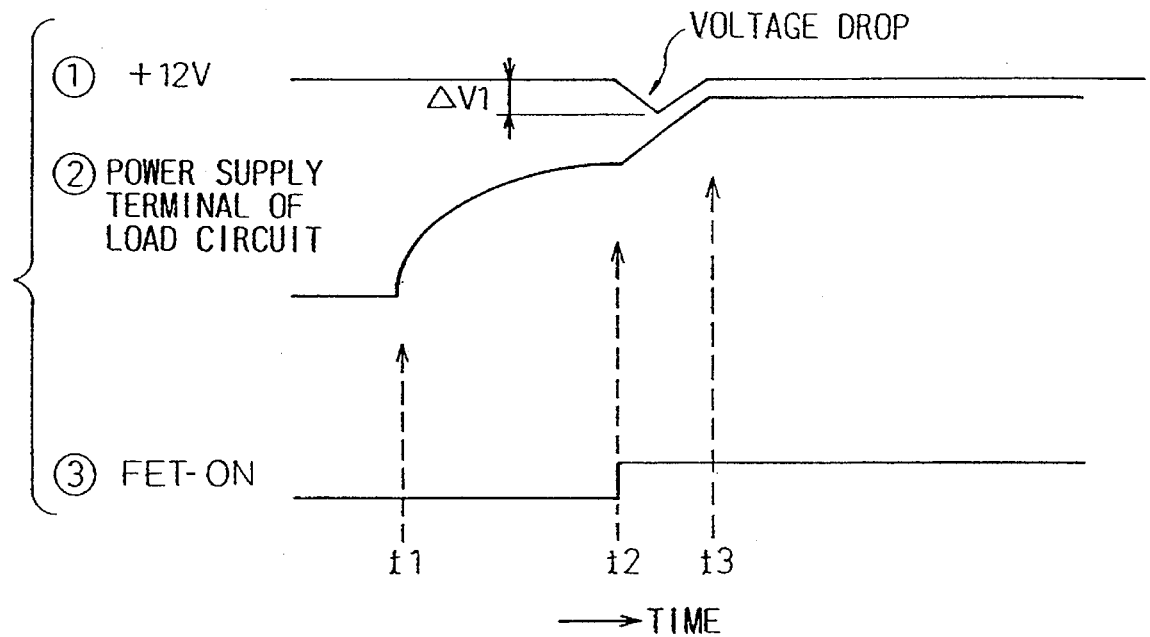
FIG. 23A is a time chart for explaining the operation of a conventional power supply system for comparison with the case of a fourth preferred embodiment of the present invention.
Figure 23B:
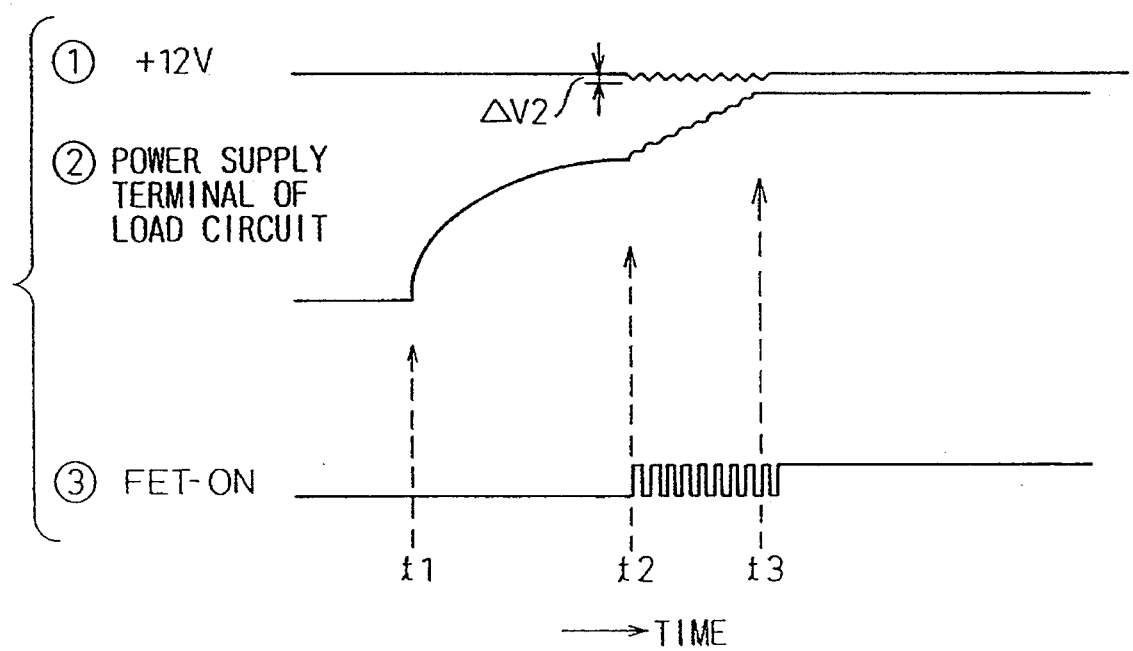
FIG. 23B is a time chart for explaining a second example of the operation of a power supply system according to a fourth preferred embodiment of the present invention.

FIG. 23A is a time chart for explaining the operation of a conventional power supply system for comparison with the case of a fourth preferred embodiment of the present invention; and FIG. 23B is a time chart for explaining a second example of the operation of a power supply system according to the fourth preferred embodiment.

Each of these operations connects a power line to a corresponding load circuit, which is connected to a breaker circuit, by coupling male and female pins of connectors.

According to the fourth preferred embodiment shown in FIG. 23B, the MPU 28 repeatedly turns ON and OFF the FET Q11 at short intervals after a supply voltage reaches a predetermined value, to increase the voltage of the load circuit. This technique minimizes a voltage drop, to prevent an adverse effect on the other load circuits.

Here, the conventional power supply system of the prior art shown in FIG. 23A will be explained.

At the timing corresponding to time t1, the pins of the connector 44 are coupled. Then, a current passes through a current limit resistor R6 to the load circuit, to charge a capacitor (not shown).

The terminal voltage of the load circuit gradually increases. At the timing corresponding to time t2, the MPU 28 sets the FF set signal *F-SET to a low level. As a result, the FET ON signal FET-ON of ③ changes to a high level to turn ON the FET Q11.

Once the FET Q11 is turned ON, the terminal voltage of the load circuit (i.e., the voltage at the power supply terminal of the load circuit indicated with ②) rapidly increases to a predetermined value, and at the timing corresponding to time t3, the supply voltage is established. During this period, a large voltage drop V1 occurs in the +12-volt power line (①).

The large voltage drop V1 may cause a malfunction in another load circuit that is operating. To avoid such a voltage drop, elements having a large voltage margin must be employed. This restricts design criteria, increases the cost of production, and deteriorates reliability of the system.

The operation of the second example of the fourth preferred embodiment will be explained with reference to FIG. 23B.

At the timing corresponding to time t1, the pins of the connector 44 are coupled, and a current flows to the load circuit through the current limit resistor R6, to charge the capacitor (not shown).

As a result, the terminal voltage of the load circuit gradually increases, and at the timing corresponding to time t2, the terminal voltage (②) of the load circuit reaches a predetermined value. The MPU 28 sends a control signal to the short-circuit protection control circuit 25, to alternate the level of the signal FET-ON of (③) between high and a low levels, to thereby repeatedly turn ON and OFF the FET Q11.

Repeatedly turning ON and OFF the FET Q11 gradually increases the voltage (②) of the load circuit, and the supply voltage is established at the timing corresponding to time t3. This technique causes a very small voltage drop V2 in the +12-volt power line (①), compared with the voltage drop V1 of the prior art.

Figure 24:
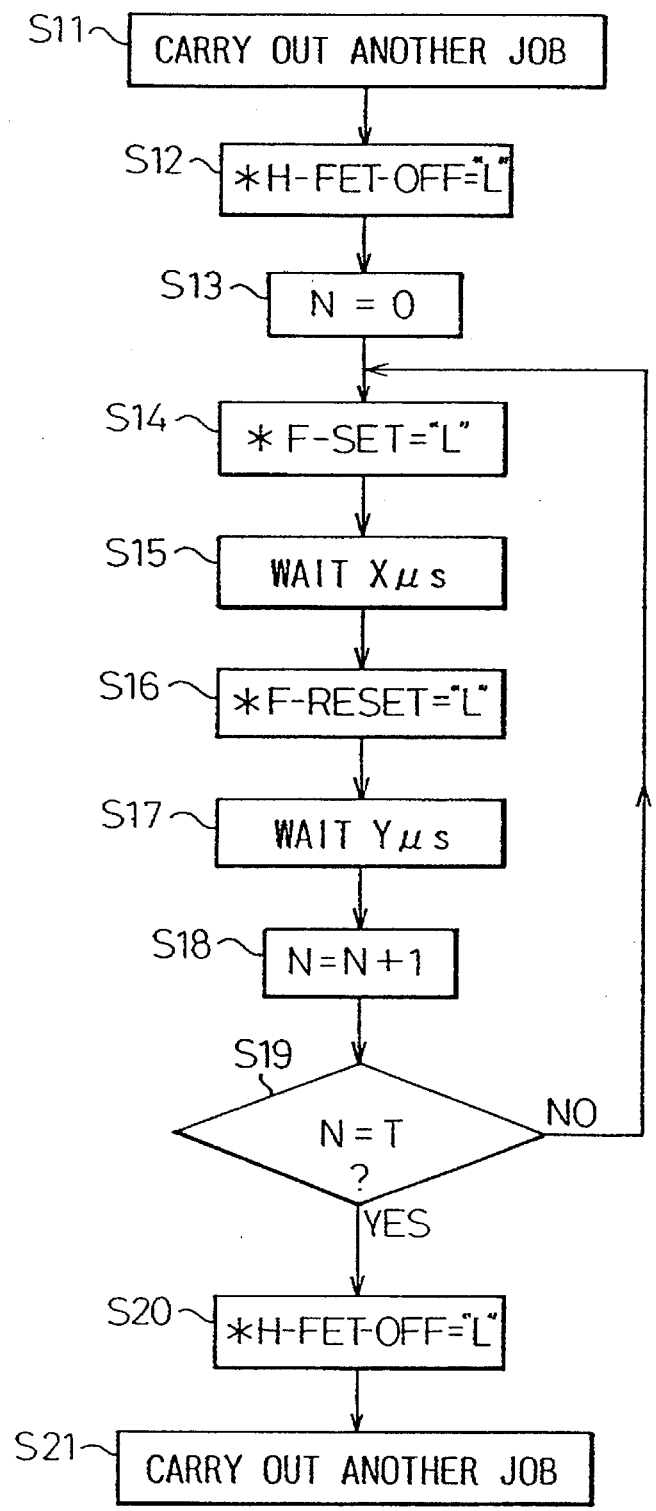
FIG. 24 is a flowchart for explaining a second example of the operation of a power supply system according to a fourth preferred embodiment of the present invention.

FIG. 24 is a flowchart for explaining a second example of the operation of a power supply system according to a fourth preferred embodiment of the present invention. This flowchart corresponds to the operation of FIG. 23B.

This operation connects a power line to a given load circuit, which is connected to a breaker circuit, by coupling the male and female pins of the connector 44 of the load circuit, and repeatedly turns ON and OFF the FET Q11 of the breaker circuit, to gradually increase the voltage of the load circuit.

In step S11, the MPU 28 carries out another job. In step S12, the MPU 28 sets the signal *H-FET-OFF to a low level after the voltage monitor circuit 29 indicates that the power source has been completely activated. In Step S13, the MPU 28 clears a count (N=0).

In step S14, the MPU 28 sets the signal *F-SET to a low level to turn ON the FET Q11, and waits X microseconds (μsec) in step S15.

After X microseconds, the MPU 28 sets, in step S16, the signal *F-RESET to a low level to set the signal FET-ON to a low level and turn OFF the FET Q11. In step S17, the MPU 28 waits Y microseconds.

After Y microseconds, the MPU 28 increases the count N by one (N=N+1) in step S18. In step S19, the MPU 28 determines whether or not the count N is equal to a predetermined repetition threshold T.

If the count N is not equal to the threshold T, the flow goes to the step S14. If N=T, the MPU 28 sets the signal *H-FET-OFF to a low level in step S20, and in step S21, carries out another job.

In this way, the voltage of the load circuit is gradually increased by repeatedly turning ON and OFF the FET Q11. This technique reduces a voltage drop to be caused when the FET Q11 is turned ON to apply a voltage to the load circuit, thereby eliminating an adverse effect on the other load circuits.

Figure 25:
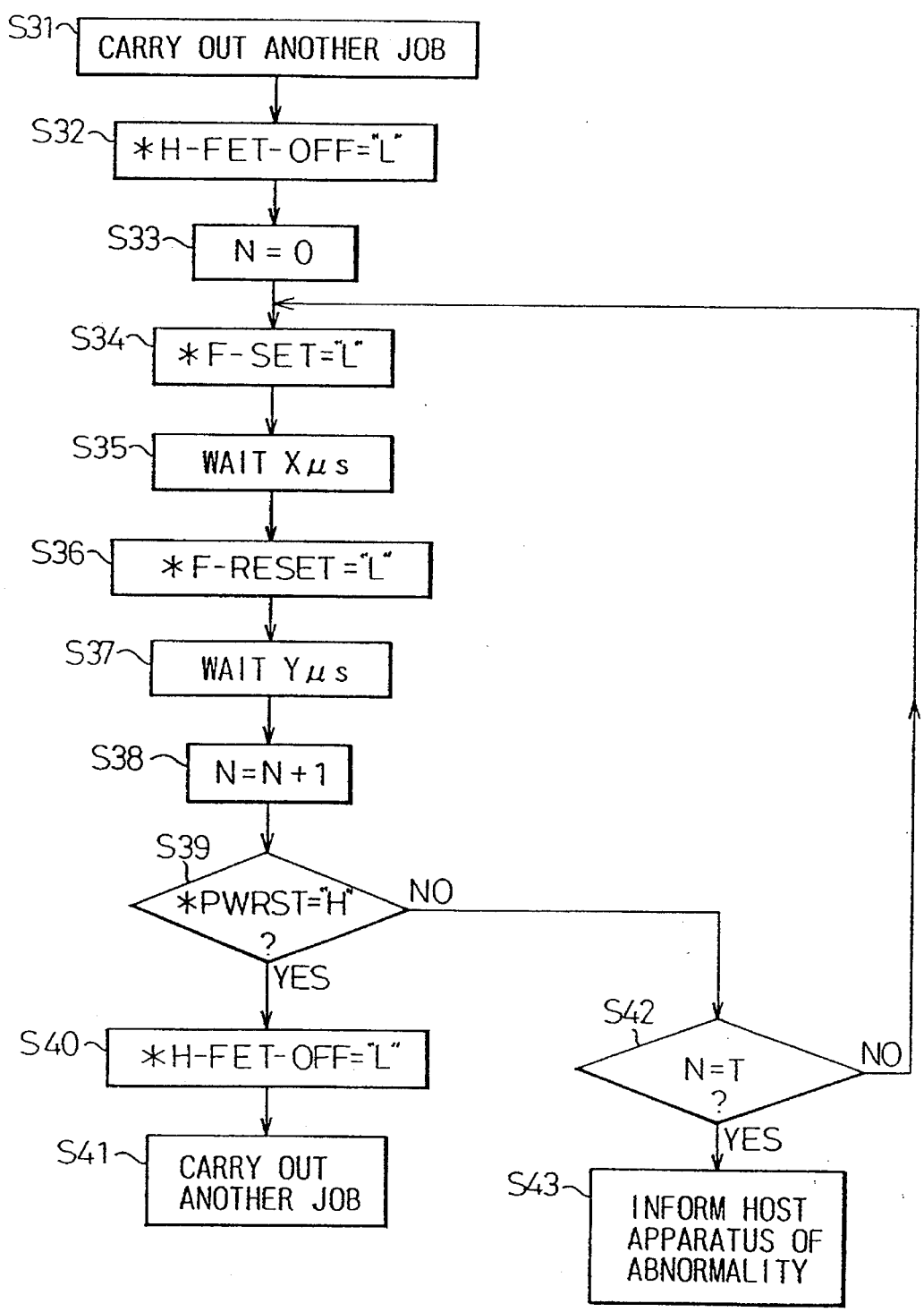
FIG. 25 is a flowchart showing the operation of a power supply system according to a fourth preferred embodiment of the present invention after the operation shown in FIG. 24 is carried out.

FIG. 25 is a flowchart showing the operation of a power supply system according to a fourth preferred embodiment of the present invention after the operation shown in FIG. 24 is carried out.

This operation carries out the process of FIG. 24 to increase the voltage of the load circuit, confirms that the voltage of the load circuit has been increased to a predetermined value according to a signal from the voltage monitor circuit 29, and then completely turns ON the FET Q11.

In step S31, the MPU 28 carries out another job. When the voltage monitor circuit 29 indicates that the power source has been activated, the MPU 28 sets the signal *H-FET-OFF to a low level in step S32. In step S33, the MPU 28 clears the count N (N=0).

In step S34, the MPU 28 sets the signal *F-SET to a low level to turn ON the FET Q11, and in step S35, waits X microseconds.

After X microseconds, the MPU 28 sets, in step S36, the signal *F-RESET to a low level to set the signal FET-ON to a low level and turn OFF the FET Q11. In step S37, the MPU 28 waits Y microseconds.

After Y microseconds, the MPU 28 increases the count N by 1 (N=N+1) in step S38. In step S39, the MPU 28 determines whether the power reset signal *PWRST from the voltage monitor circuit 29 is at high or a low level.

If the signal *PWRST is at a low level, the voltage of the load circuit is below a predetermined value. Then, the MPU 28 determines in step S42 whether or not the count N is equal to a predetermined repetition threshold T.

If N is not equal to T, the flow returns to the step S34, and if N=T, the MPU 28 informs a host apparatus of an abnormality in step S43.

If the power reset signal *PWRST is at a high level in the step S39, the voltage of the load circuit is at the predetermined value, so that the MPU 28 sets the signal *H-FET-OFF to a low level in step S40. In step S41, the MPU 28 carries out another job.

In this way, the voltage of a load circuit is gradually increased by repeatedly turning ON and OFF the FET Q11. If it is confirmed that the voltage of the load circuit has reached a predetermined value, the FET Q11 is completely connected to the load circuit. Accordingly, the power line is surely connected to the load circuit.

Figure 26:
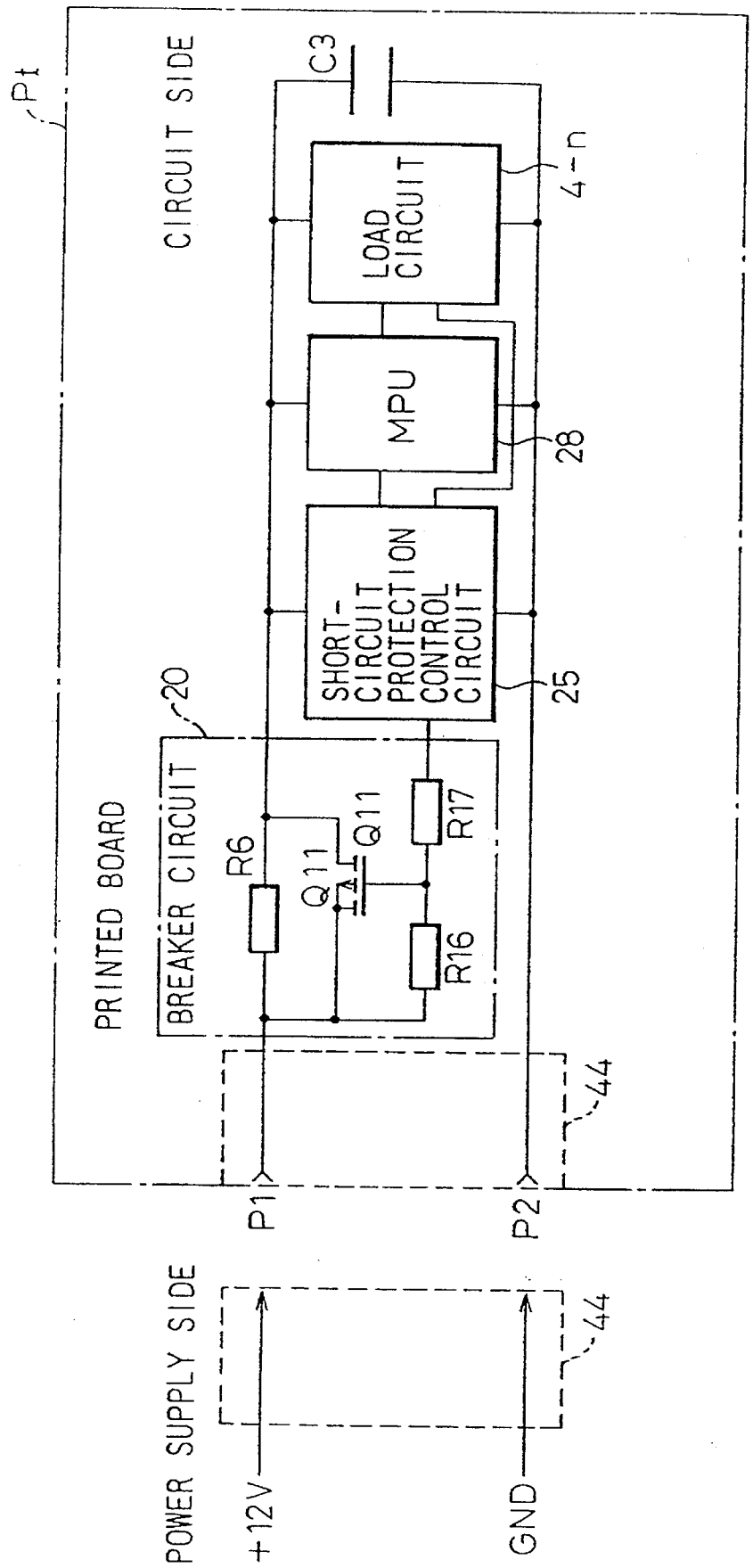
FIG. 26 is a block diagram showing a power supply system according to a fifth preferred embodiment of the present invention.

FIG. 26 is a block diagram showing a power supply system according to a fifth preferred embodiment of the present invention.

This preferred embodiment enables each load circuit to be connected and disconnected to and from a power source under an active state.

Each load circuit is formed on a printed board Pt, which has a connector 44 having female pins. The connector 44 is coupled with a connector 44 having male pins on the power source side.

On the printed board Pt, the connector 44 is connected to a power line having a breaker circuit 20. The output of the breaker circuit 20 is connected to a short-circuit protection control circuit 25, an MPU 28, a load circuit 4-n, a capacitor C3, etc. These elements receive power through the connector 44.

The breaker circuit 20 has a FET Q11 and a resistor R6, which are connected in parallel with each other. The breaker circuit 20 also has bias resistors R16 and R17 for the FET Q11.

The MPU 28 for controlling the load circuit 4-n is connected to a +12-volt power line that is connected to the load circuit 4-n. The MPU 28 carries out various control operations as explained before, until the FET Q11 of the breaker circuit 20 is turned ON.

The MPU 28 is designed to be driven with small power, so that there will be large differences in operation voltage and current between the MPU 28 and the load circuit 4-n. This will be explained below.

The system of FIG. 21 operates like the system of the fourth preferred embodiment under the control of the MPU 28. When the connectors 44 are coupled, the FET Q11 is OFF, and therefore, the resistor R6 passes a limited current.

In this state, the MPU 28 carries out the processes mentioned above. When the voltage of the power line increases to a predetermined value, the MPU 28 turns ON the FET Q11. Accordingly, the MPU 28 is designed to work with the limited current passing through the current limit resistor R6.

The resistance of the resistor R6 is determined so that the operation voltage and current of the MPU 28 are secured even if the FET Q11 is OFF. If these conditions are met, an active connection or disconnection of the load circuit is easily achieved without employing the special connectors of FIG. 5A.

The operation of the fifth preferred embodiment is the same as that of the other preferred embodiments, and therefore, it is not explained again.

Further, the present invention is also achievable in the following manners:

(1) Each load circuit is not limited to a magnetic disk unit but is optional.

(2) The power supply system may employ a single power source circuit or a plurality of power source circuits.

(3) The breaker element may be not only a FET but also another semiconductor element such as a bipolar transistor, a thyristor, etc.

(4) The embodiments detect an overcurrent generated in a load circuit due to a short-circuit failure and cut off a power line from the load circuit.

It is possible to turn OFF the FET in response to an abnormal current out of a range specified by an MPU.

In summary, the present invention provides the following effects:

(1) The first preferred embodiment of the present invention employs a power source circuit and a plurality of load circuits that receive power from the power source circuit through respective power lines. Each of the power lines is provided with a FET serving as a breaker element, and an overcurrent detection resistor.

On the other hand, the prior art employs a fuse that melts in response to an overcurrent due to a short-circuit failure occurring in a load circuit. The fuse prevents the short-circuit failure from adversely affecting the other load circuits. The prior art must have a device to maintain a supply voltage within a specified range until the fuse melts. Accordingly, the prior art arranges a large capacitor in power lines, or employs a large power source. This increases the cost, deteriorates reliability, and limits design criteria.

Unlike the prior art, the present invention employs the FET to cut off a power line from a load circuit. The FET has a short response time. For example, the response time of the FET is 10 microseconds, while that of the fuse is 100 milliseconds. Accordingly, the present invention is capable of employing a power source of proper capacity and omitting the large capacitor.

The prior art must reduce the ratio of an operation current to a fusing current of the fuse, to shorten the melting time of the fuse. Then, the fuse will easily fatigue and break with use. This and the large capacitor deteriorate reliability. The present invention solves these problems.

(2) If an overcurrent detection resistor is connected to a power line, a circuit current always flows through this resistor. Accordingly, the resistor must be of large capacity. In addition, the overcurrent detection resistor causes a voltage drop to destabilize circuit operation.

If the resistance of the overcurrent detection resistor is reduced to about 0.1 ohms to prevent the voltage drop, the resistor must be a wire-wound resistor whose reliability is low due to fatigue.

The second preferred embodiment of the present invention employs, as the overcurrent detection resistor, a current detection resistor arranged for another purpose in a load circuit, thus solving the above problem. The present invention requires no additional parts to detect an overcurrent, thereby reducing the cost while maintaining reliability.

(3) When a FET is turned OFF to cut off a power line from a load circuit, the present invention again turns ON the FET to connect the power line to the load circuit, thereby testing whether or not an overcurrent really flows. If the overcurrent really flows, the present invention completely cuts the power line. This technique prevents an error in detecting the overcurrent.

This technique avoids an erroneous detection caused by an unexpected counter-electromotive force generated by a motor in the load circuit, or by external noise. This technique improves reliability.

(4) The present invention turns ON a FET to connect a power line to a load circuit only after a voltage monitor circuit provides a signal indicating that a power source has been successfully activated. If the power source of an MPU is different from the power source of a short-circuit protection controller, the MPU is initialized at first, and then, the FET is turned ON to connect the power line to the load circuit.

This technique stabilizes the operation of the load circuit. The power source of the load circuit is not activated until it is required, and until then, the MPU may carry out another job such as an initialization job.

In this way, the power source of the load circuit is turned ON only when the MPU is sound and ready to operate. This technique improves reliability.

(5) The present invention turns OFF a FET to cut off a power line from a load circuit in response to not only an overcurrent in the load circuit but also an abnormal current out of a range specified by an MPU.

Namely, the present invention detects a current that is not specified by an MPU or a current that must not be generated. By detecting a circuit abnormality in addition to a short-circuit failure, the present invention improves reliability.

(6) The present invention repeatedly turns ON and OFF a FET at short intervals to increase the voltage of a load circuit until a power line is completely connected to the load circuit.

If the FET is turned ON at once without repeatedly turning ON and OFF the same, a large voltage drop occurs in the power line to cause an error in another load circuit that is active. To avoid such a voltage drop, it is necessary to employ elements having a large voltage margin. This restricts design criteria, increases the cost, and deteriorates reliability.

To solve this problem, the present invention repeatedly turns ON and OFF the FET at short intervals, to increase the voltage of the load circuit. This technique suppresses a voltage drop occurring in the power line, to solve the problem mentioned above, improve reliability, and decrease the cost.

(7) The present invention confirms that the voltage of a load circuit has reached a predetermined value according to a signal from a voltage monitor circuit, and then, turns ON a FET to connect a power line to the load circuit.

The load circuit carries out an OFF-loop operation that is based on an assumption that a target voltage must be obtained if the FET is alternately switched for a designed period. If some circuit is out of order from the beginning, the switching operation of the FET will complete before the target voltage is obtained, and insufficient power supply will be connected to the load circuit. This results in dropping a supply voltage, to adversely affect the other circuits.

When the switching period of the FET is determined to absorb circuit fluctuations, it elongates a rise time.

To solve these problems, the present invention turns ON the FET after the target voltage is surely obtained. When the voltage monitor circuit provides a signal indicating that the supply voltage has reached the target value, the present invention stops the switching operation of the FET, thereby shortening the rise time of the power line through the FET.

(8) The fifth preferred embodiment of the present invention connects an MPU and a load circuit to the same power line, and connects a FET in parallel with a current limit resistor. The MPU is driven with a small current passing through the current limit resistor when the FET is OFF.

The power line of the load circuit has a connector, so that the load circuit is connected to and disconnected from a power source under an active state only by switching the FET without using special connectors.

This embodiment realizes a live connection/disconnection operation even in a single compact power supply system without using special connectors. This embodiment, therefore, is effective to reduce the cost and improve reliability.

We claim:

1. A power supply system for supplying power from a power source circuit to a load circuit through a respective power line, comprising:

a breaker element provided for said power line, which is turned ON and OFF in response to external control signals, to connect and disconnect said power source circuit to and from said load circuit;

overcurrent detection means provided for said power line for detecting an overcurrent in said load circuit;

a short-circuit protection controller provided for said power line, which turns OFF said breaker element to disconnect said power line from said load circuit if a signal from said overcurrent detection means indicates that there is an overcurrent in said load circuit;

a control circuit connected to said power line of said load circuit, for controlling said load circuit; and current limit means connected in parallel with said breaker element, for passing a small current while said breaker element if OFF, said control circuit being sufficiently driven with the small current.

2. The system according to claim 1, further comprising control means for turning ON said breaker element after said breaker element is turned OFF by said short circuit protection controller to resume the supply of power to said load circuit and confirm whether or not an overcurrent flows from said load circuit, said control means turning OFF said breaker element again if overcurrent flow is confirmed.

3. The system according to claim 1, further comprising:

a voltage monitor circuit for monitoring the voltage of said load circuit; and control means for turning ON said breaker element to completely connect said power source circuit to said load circuit if a signal from said voltage monitor circuit indicates that a power source has been successfully activated.

4. The system according to claim 1, further comprising;

a control circuit for controlling said load circuit; and control means provided for the control circuit, for turning ON said breaker element after the initialization of said control circuit, to connect said power source circuit to said load circuit, when a power source of said control circuit is different from that of said short-circuit protection controller.

5. The system according to claim 1, further comprising:

a control circuit for controlling said load circuit; and control means provided for said control circuit, for turning OFF said breaker element to cut off said power line from said load circuit in response to either an overcurrent or an abnormal current out of range specified by said control circuit.

6. The system according to claim 1, further comprising:

a connector connected to said power line of said load circuit; and control means provided for said control circuit, for turning ON said breaker element to connect said power source circuit to said load circuit after detecting that said connector has been connected to said power source circuit, said control circuit has been initialized, and said voltage of said load circuit has reached a predetermined value.

7. The system according to claim 1, wherein said breaker element comprises a field effect transistor.

8. The system according to claim 1, wherein said load circuit comprises a motor drive circuit of a magnetic disk unit.

9. The system according to claim 1, wherein:

said overcurrent detection means comprises an overcurrent detection resistor; and said current limit means comprises a current resistor.

10. The system according to claim 1, further comprising control means for repeatedly turning ON and OFF said breaker element to increase the voltage of said load circuit, and for completely turning ON said breaker element to connect said power source circuit to said load circuit.

11. The system according to claim 10, further comprising:

a voltage monitor circuit for monitoring the voltage of said load circuit; and control means for confirming that the voltage of said load circuit has reached a predetermined value according to a signal from the voltage monitor circuit, and turning ON said breaker element to connect said power source circuit to said load circuit.

12. A power supply system for supplying power from a power source circuit to a load circuit through a respective power line, comprising:

a breaker element provided for said power line, which is turned ON and OFF in response to external control signals, to connect and disconnect said power source circuit to and from said load circuit;

a short-circuit protection controller provided for said power line, which turns OFF said breaker element to disconnect said power line from said load circuit in response to an overcurrent signal indicating that there is an overcurrent in said load circuit;

a control circuit connected to said power line of said load circuit, for controlling said load circuit; and current limit means connected in parallel with said breaker element, for passing a small current while said breaker element is OFF, said control circuit being sufficiently driven with the small current.

13. The system according to claim 12, further comprising control means for turning ON said breaker element after said breaker element is turned OFF by said short circuit protection controller to resume the supply of power to said local circuit and confirm whether or not an overcurrent flows from said load circuit, said control means turning OFF said breaker element again if the overcurrent flow is confirmed.

14. The system according to claim 12, further comprising:

a voltage monitor circuit for monitoring the voltage of said load circuit; and control means for turning ON said breaker element to completely connect said power source circuit to said load circuit if a signal from said voltage monitor circuit indicates that a power source has been successfully activated.

15. The system according to claim 12, further comprising;

a control circuit for controlling said load circuit; and control means provided for the control circuit, for turning ON said breaker element after the initialization of said control circuit, to connect said power source circuit to said load circuit, when a power source of said control circuit is different from that of said short-circuit protection controller.

16. The system according to claim 12, further comprising:

a control circuit for controlling said load circuit; and control means provided for said control circuit, for turning OFF said breaker element to cut off said power line from said load circuit in response to either an overcurrent or an abnormal current out of a range specified by said control circuit.

17. The system according to claim 12, further comprising:

a connector connected to said power line of said load circuit; and control means provided for said control circuit, for turning ON said breaker element to connect said power source circuit to said load circuit after detecting that said connector has been connected to said power source circuit, said control circuit has been initialized, and said voltage of said load circuit has reached a predetermined value.

18. The system according to claim 12, further comprising control means for repeatedly turning ON and OFF said breaker element to increase the voltage of said load circuit, and for completely turning ON said breaker element to connect said power source circuit to said load circuit.

19. The system according to claim 18, further comprising:

a voltage monitor circuit for monitoring the voltage of said load circuit; and control means for confirming that the voltage of said load circuit has reached a predetermined value according to a signal from the voltage monitor circuit, and turning ON said breaker element to connect said power source circuit to said load circuit.

20. The system according to claim 12, wherein said current limit means comprises a current limit resistor.

* * * * *

UNITED STATES PATENT AND TRADEMARK OFFICE
CERTIFICATE OF CORRECTION

PATENT NO. : 5,592,353              Page 1 of 2

DATED : January 7, 1997

INVENTOR(S) : Shinohara et al.

It is certified that error appears in the above-indentified patent and that said Letters Patent is hereby corrected as shown below:

Column 4, line 21, before "objects", delete "main".

Column 4, line 52, delete "ØN" and insert --ON--.

Column 10, line 24, delete "iS" and insert --is--.

Column 10, line 52, delete "*-FSET="H"" and insert --*F-SET="H"--.

Column 11, line 3, delete "FETON" and insert --FET-ON--.

UNITED STATES PATENT AND TRADEMARK OFFICE
CERTIFICATE OF CORRECTION

PATENT NO. : 5,592,353
DATED : January 7, 1997
INVENTOR(S) : Shinohara et al.

It is certified that error appears in the above-indentified patent and that said Letters Patent is hereby corrected as shown below:

Column 12, line 43, delete "r4" and insert --R4--.

Column 22, line 62, after "current", insert --limit--.

Column 23, line 31, delete "local" and insert --load--.

Signed and Sealed this

Seventh Day of October, 1997

*Attest:*

BRUCE LEHMAN

*Attesting Officer*        *Commissioner of Patents and Trademarks*